(12) United States Patent
Hwang

(10) Patent No.: US 12,744,757 B2
(45) **Date of Patent: *Sep. 22, 2026**

(54) METHOD AND DEVICE FOR ALLOCATING IP ADDRESS TO DU IN INTEGRATED ACCESS AND BACKHAUL SYSTEM

(71) Applicant: Samsung Electronics Co., Ltd., Suwon-si (KR)

(72) Inventor: June Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

This patent is subject to a terminal disclaimer.

(21) Appl. No.: 18/779,704

(22) Filed: Jul. 22, 2024

(65) Prior Publication Data

US 2024/0380728 A1 Nov. 14, 2024

Related U.S. Application Data

(63) Continuation of application No. 17/913,657, filed as application No. PCT/KR2021/004498 on Apr. 9, 2021, now Pat. No. 12,047,348.

(30) Foreign Application Priority Data

Apr. 9, 2020 (KR) ........................ 10-2020-0043585
Apr. 9, 2020 (KR) ........................ 10-2020-0043660
May 21, 2020 (KR) ........................ 10-2020-0061194

(51) Int. Cl.
*H04W 76/00* (2018.01)
*H04L 61/5007* (2022.01)
(Continued)

(52) U.S. Cl.
CPC ........... *H04L 61/5007* (2022.05); *H04W 8/26* (2013.01); *H04W 36/0055* (2013.01); *H04L 2101/618* (2022.05); *H04W 36/362* (2023.05)

(58) Field of Classification Search
None
See application file for complete search history.

(56) References Cited

U.S. PATENT DOCUMENTS 11,510,131 B2 11/2022 Zhu et al.
2013/0028139 A1 1/2013 Sanneck et al.
(Continued)

FOREIGN PATENT DOCUMENTS

CN 110475267 A 11/2019
CN 110536351 A 12/2019
(Continued)

OTHER PUBLICATIONS

Zte et al. "The Remaining Issues on IP Address Allocation in IAB", R3-196686, 3GPP TSG-RAN WG3 #1 06, Reno, USA, Nov. 9, 2019.

(Continued)

*Primary Examiner* — Christopher B Robinson
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

11 Claims, 17 Drawing Sheets

(51) Int. Cl.

| | |
|---|---|
| ***H04W 8/26*** | (2009.01) |
| ***H04W 36/00*** | (2009.01) |
| ***H04W 40/24*** | (2009.01) |
| ***H04W 88/00*** | (2009.01) |
| *H04L 101/618* | (2022.01) |
| *H04W 36/36* | (2009.01) |

(56) References Cited

U.S. PATENT DOCUMENTS

| | | | | |
|---|---|---|---|---|
| 2016/0044744 | A1* | 2/2016 | Lee | H04W 16/32 370/329 |
| 2017/0318505 | A1* | 11/2017 | Park | H04W 36/0069 |
| 2019/0124181 | A1 | 4/2019 | Park et al. | |
| 2020/0029389 | A1* | 1/2020 | Yilmaz | H04W 8/08 |
| 2020/0045610 | A1 | 2/2020 | Shih et al. | |
| 2020/0045764 | A1* | 2/2020 | Kim | H04W 36/00695 |
| 2020/0053815 | A1* | 2/2020 | Teyeb | H04W 76/11 |
| 2020/0084663 | A1 | 3/2020 | Park et al. | |
| 2020/0120725 | A1 | 4/2020 | Mildh et al. | |
| 2021/0127430 | A1 | 4/2021 | Teyeb et al. | |
| 2021/0152515 | A1 | 5/2021 | Akl et al. | |
| 2021/0185753 | A1 | 6/2021 | Mattam et al. | |
| 2021/0266991 | A1 | 8/2021 | Teyeb et al. | |
| 2021/0409328 | A1 | 12/2021 | Xu et al. | |
| 2022/0201777 | A1 | 6/2022 | Teyeb et al. | |

FOREIGN PATENT DOCUMENTS

| | | | | |
|---|---|---|---|---|
| KR | 10-2019-0098693 | A | 8/2019 | |
| WO | 2019/216717 | A1 | 11/2019 | |
| WO | 2019/240646 | A1 | 12/2019 | |
| WO | 2020/027713 | A1 | 2/2020 | |
| WO | WO-2020039348 | A2 * | 2/2020 | H04W 52/0219 |
| WO | WO-2020039400 | A1 * | 2/2020 | H04L 12/4633 |
| WO | WO-2021147107 | A1 * | 7/2021 | H04W 40/36 |

OTHER PUBLICATIONS

Ericsson "IAB-MT Feature Capabilities", R2-2000754, 3GPP TSG RAN WG2 #109-e, Feb. 13, 2020.

Zte et al. "Discussion on the RRC signalling for IP address allocation", R2-2000511, 3GPP TSG RAN WG2 #109-e, Feb. 14, 2020.

Ericsson "On Multi-connectivity for IAB", R2-2000743, 3GPP TSG RAN WG2 Meeting #109-e, Feb. 13, 2020.

Nokia et al.; "Routing and mapping configuration in IAB nodes;" 3GPP TSG-RAN WG2 Meeting #107bis; R2-1913462; XP051805005; Oct. 14-18, 2019; Chongqing, China; Oct. 4, 2019.

Qualcomm Incorporated; "(TP for NR_IAB BL CR to TS 38.331) IP address configuration;" 3GPP TSG-RAN WG2 Meeting #109-e; R2-2000482; XP051848557; Feb. 24-Mar. 6, 2020; Electronic meeting; Feb. 13, 2020.

Samsung; "Further discussion on IP address issues of IAB network;" 3GPP TSG-RAN WG3 Meeting #105bis; R3-194994 was R3-193979; Oct. 14-18, 2019; Chongqing, China; Oct. 4, 2019.

European Search Report dated Jul. 19, 2023; European Appln. No. 21784767.2-1215/4117326 PCT/KR2021004498.

Samsung; Report on email discussion [Post109e_26][IAB] IP address allocation; 3GPP TSG-RAN WG2 #109b-e; R2-20xxxxx; E-meeting; Apr. 2020; Mar. 26, 2020.

Samsung; Further discussion on IP address issues of IAB network; 3GPP TSG-RAN WG2 Meeting #104; R3-192608; Reno, NV, USA; May 13-17, 2019; May 2, 2019.

Samsung; Summary of offline discussion on CB: # 44_Email044-IAB_IPaddr_mgmt; 3GPP TSG-RAN WG3 #107-e; R3-201143; Feb. 24-Mar. 6, 2020; E-Meeting; Feb. 28, 2020.

Chinese Office Action with English translation dated May 27, 2024; Chinese Appln. No. 202180025784.1.

Huawei; Support of multiple connectivity in IAB network; 3GPP TSG-RAN WG3 Meeting #105bis; R3-195459; revision of R3-194340; Chongqing, China; Oct. 14-18, 2019; Oct. 5, 2019.

European Search Report dated Oct. 23, 2024; European Appln. No. 21 784 767.2-1215.

Korean Office Action with English translation dated Oct. 30, 2024; Korean Appln. No. 10-2020-0061194.

Chinese Office Action with English translation dated Oct. 29, 2024; Chinese Appln. No. 202180025784.1.

* cited by examiner

FIG. 6

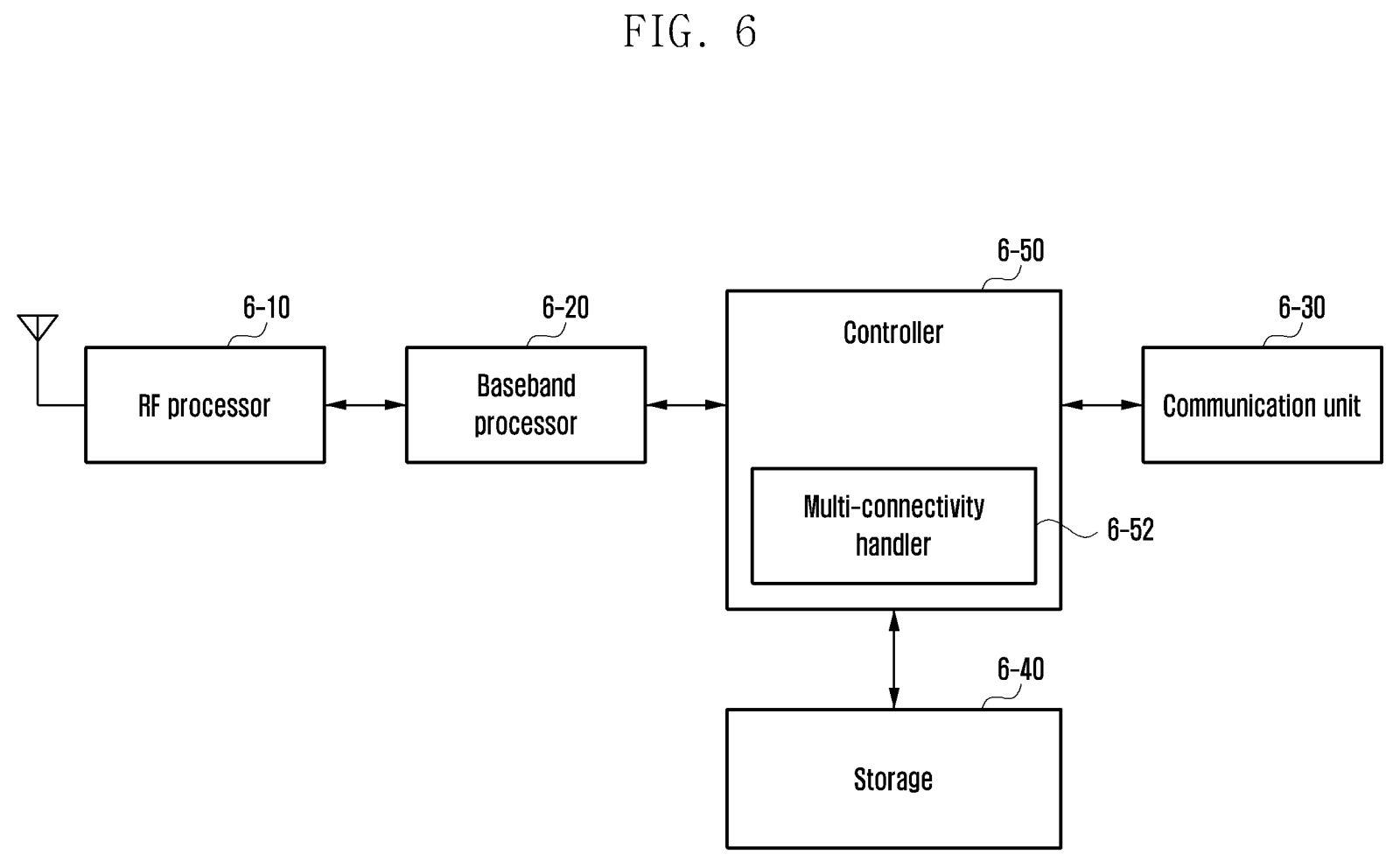

6-30 Communication unit 6-50 Controller 6-52 Multi-connectivity handler 6-40 Storage 6-20 Baseband processor 6-10 RF processor

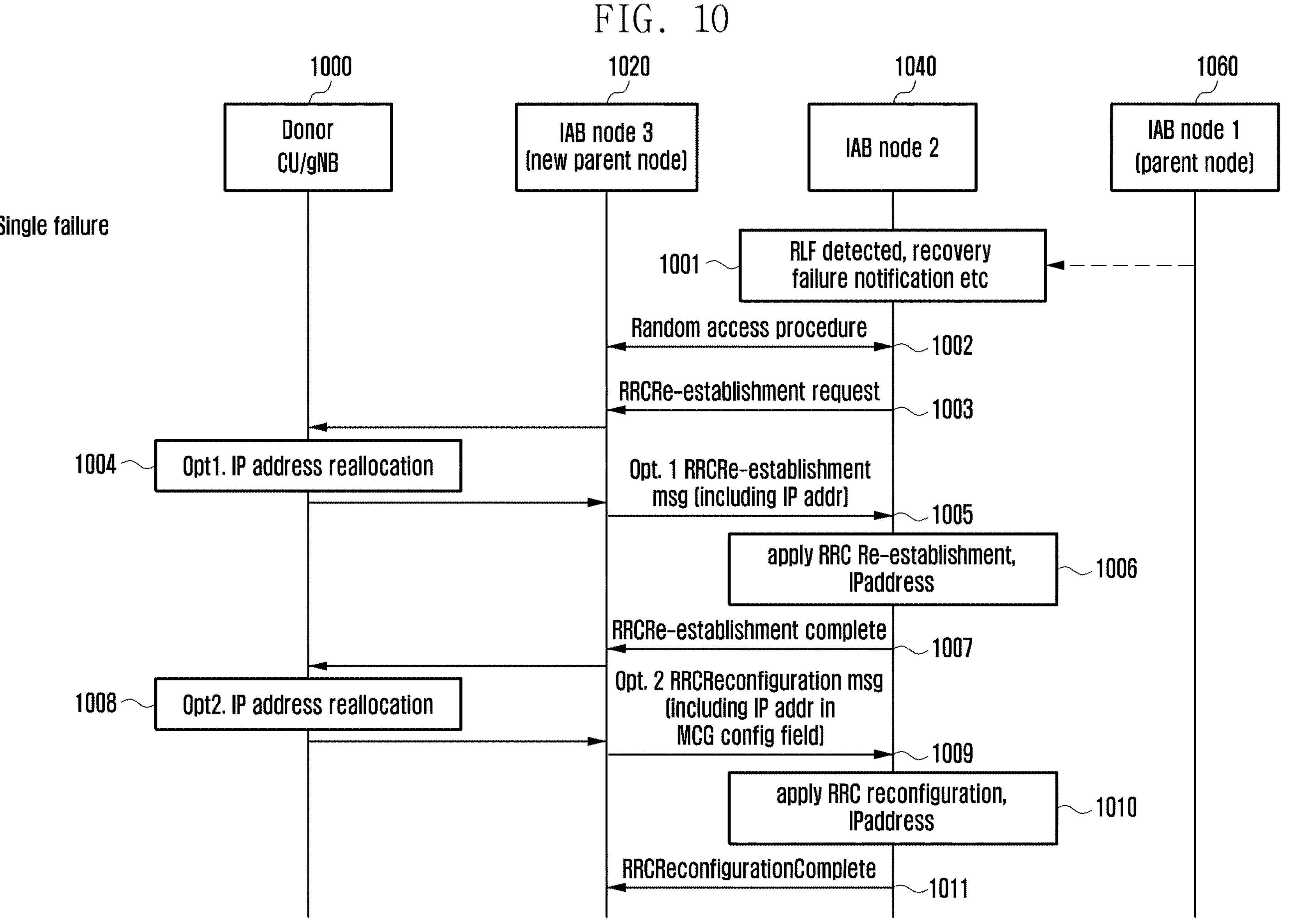

FIG. 10
1000
Donor CU/gNB
1020
IAB node 3 (new parent node)
1040
IAB node 2
1060
IAB node 1 (parent node)
Single failure
1001
RLF detected, recovery failure notification etc
Random access procedure
1002
RRCRe-establishment request
1003
1004
Opt1. IP address reallocation
Opt. 1 RRCRe-establishment msg (including IP addr)
1005
apply RRC Re-establishment, IPaddress
1006
RRCRe-establishment complete
1007
1008
Opt2. IP address reallocation
Opt. 2 RRCReconfiguration msg (including IP addr in MCG config field)
1009
apply RRC reconfiguration, IPaddress
1010
RRCReconfigurationComplete
1011

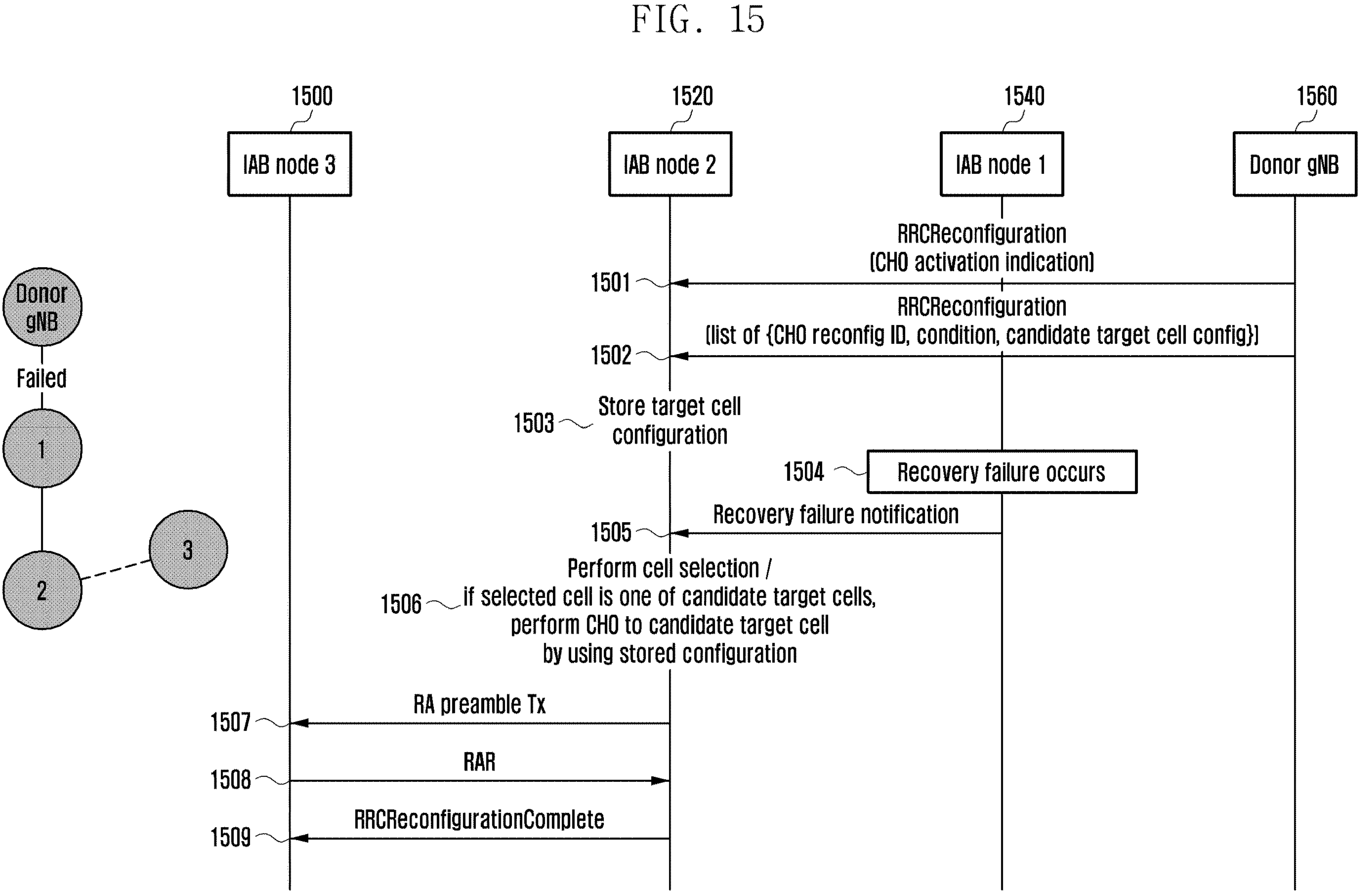
FIG. 15
1500
IAB node 3
1520
IAB node 2
1540
IAB node 1
1560
Donor gNB
RRCReconfiguration
(CHO activation indication)
1501
RRCReconfiguration
(list of {CHO reconfig ID, condition, candidate target cell config})
1502
1503
Store target cell configuration
1504
Recovery failure occurs
Recovery failure notification
1505
1506
Perform cell selection /
if selected cell is one of candidate target cells,
perform CHO to candidate target cell
by using stored configuration
RA preamble Tx
1507
RAR
1508
RRCReconfigurationComplete
1509
Donor gNB
Failed
1
2
3

METHOD AND DEVICE FOR ALLOCATING IP ADDRESS TO DU IN INTEGRATED ACCESS AND BACKHAUL SYSTEM

CROSS-REFERENCE TO RELATED APPLICATION(S)

This application is a continuation application of prior application Ser. No. 17/913,657, filed on Sep. 22, 2022, which has issued as U.S. Pat. No. 12,047,348 on Jul. 23, 2024, and is a U.S. National Stage application under 35 U.S.C. § 371 of an International application number PCT/KR2021/004498, filed on Apr. 9, 2021, which is based on and claims priority of a Korean patent application number 10-2020-0043585, filed on Apr. 9, 2020, in the Korean Intellectual Property Office, and of a Korean patent application number 10-2020-0043660, filed on Apr. 9, 2020, in the Korean Intellectual Property Office, and of a Korean patent application number 10-2020-0061194, filed on May 21, 2020, in the Korean Intellectual Property Office, the disclosure of which is incorporated by reference herein in its entirety.

TECHNICAL FIELD

The disclosure relates to a method of allocating an IP address to a distributed unit (DU) in an integrated access and backhaul (IAB) system of a mobile communication system. The disclosure also relates to a method and apparatus for failure recovery through conditional handover in case of a failure of an IAB node in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

The disclosure relates to a method of allocating an IP address to the DU in an integrated access and backhaul (IAB) system of a mobile communication system. In addition, the disclosure provides a method and apparatus for failure recovery through conditional handover in case of a failure of an IAB node in a wireless communication system.

Solution to Problem

The technical objectives to be achieved in the embodiments of the disclosure are not limited to those mentioned above, and other technical objectives not mentioned will be clearly understood by those of ordinary skill in the art to which the disclosure belongs from the following description.

In the disclosure for solving the above problems, a method of a first entity in an integrated access and backhaul system includes receiving, from an administration and maintenance (OAM) server, OAM data through an established data radio bearer (DRB), identifying whether an IP address is assigned based on the received OAM data, transmitting, in case that no IP address is assigned, a first message for requesting IP address allocation to a second entity, and receiving, from the second entity, a second message including information associated with an IP address based on the first message.

In some examples, the first message and the second message are radio resource control (RRC) messages.

In some examples, the first message includes possible information about at least one of IP version 4 or IP version 6 as an indicator.

In some examples, when the second message does not include information associated with an IP address, a previous IP address is maintained, and when the second message includes information associated with an IP address, the previous IP address is changed to the received IP address.

In another example of the disclosure, a method of a second entity in an integrated access and backhaul system includes receiving a first message for requesting IP address allocation from a first entity in case of being identified that no IP address is assigned based on administration and maintenance (OAM) data transmitted by an OAM server to the first entity, and transmitting the first entity a second message including information associated with an IP address based on the first message, wherein the OAM data is transmitted from the OAM server to the first entity through an established data radio bearer (DRB).

In another example of the disclosure, a first entity in an integrated access and backhaul system includes a transceiver capable of transmitting and receiving at least one signal, and a controller coupled to the transceiver, wherein the controller is configured to receive, from an administration and maintenance (OAM) server, OAM data through an established data radio bearer (DRB), identify whether an IP address is assigned based on the received OAM data, transmit, in case that no IP address is assigned, a first message for requesting IP address allocation to a second entity, and receive, from the second entity, a second message including information associated with an IP address based on the first message.

In another example of the disclosure, a second entity in an integrated access and backhaul system includes a transceiver capable of transmitting and receiving at least one signal, and a controller coupled to the transceiver, wherein the controller is configured to receive a first message for requesting IP address allocation from a first entity in case of being identified that no IP address is assigned based on administration and maintenance (OAM) data transmitted by an OAM server to the first entity, and transmit the first entity a second message including information associated with an IP address based on the first message, and wherein the OAM data is transmitted from the OAM server to the first entity through an established data radio bearer (DRB).

Advantageous Effects of Invention

According to an embodiment of the disclosure, various methods for effectively allocating an IP address to the DU in an integrated access and backhaul (IAB) system of a mobile communication system are described. In addition, according to an embodiment of the disclosure, it is possible to effectively recover from a failure of an IAB node through conditional handover.

BRIEF DESCRIPTION OF DRAWINGS

FIG. 6 is a block diagram showing the configuration of an NR base station according to the disclosure.

FIG. 10 is a diagram illustrating IP address allocation in response to a link failure in case of NR single connectivity.

FIG. 15 is a diagram illustrating a process of performing conditional handover when an IAB node receives an RLF recovery failure notification from the parent node according to an embodiment.

MODE FOR THE INVENTION

Hereinafter, the operating principle of the disclosure will be described in detail with reference to the accompanying drawings. In the following description of the disclosure, descriptions of well-known functions and structures incorporated herein may be omitted to avoid obscuring the subject matter of the disclosure. Further, the terms described below are defined in consideration of their functions in the disclosure, and these may vary depending on the intention of the user, the operator, or the custom. Hence, their meanings should be determined based on the overall contents of this specification.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in the 3rd generation partnership project long term evolution (3GPP LTE) standards. However, the disclosure is not limited by the above terms and names, and may be equally applied to systems conforming to other standards.

Figure 1:
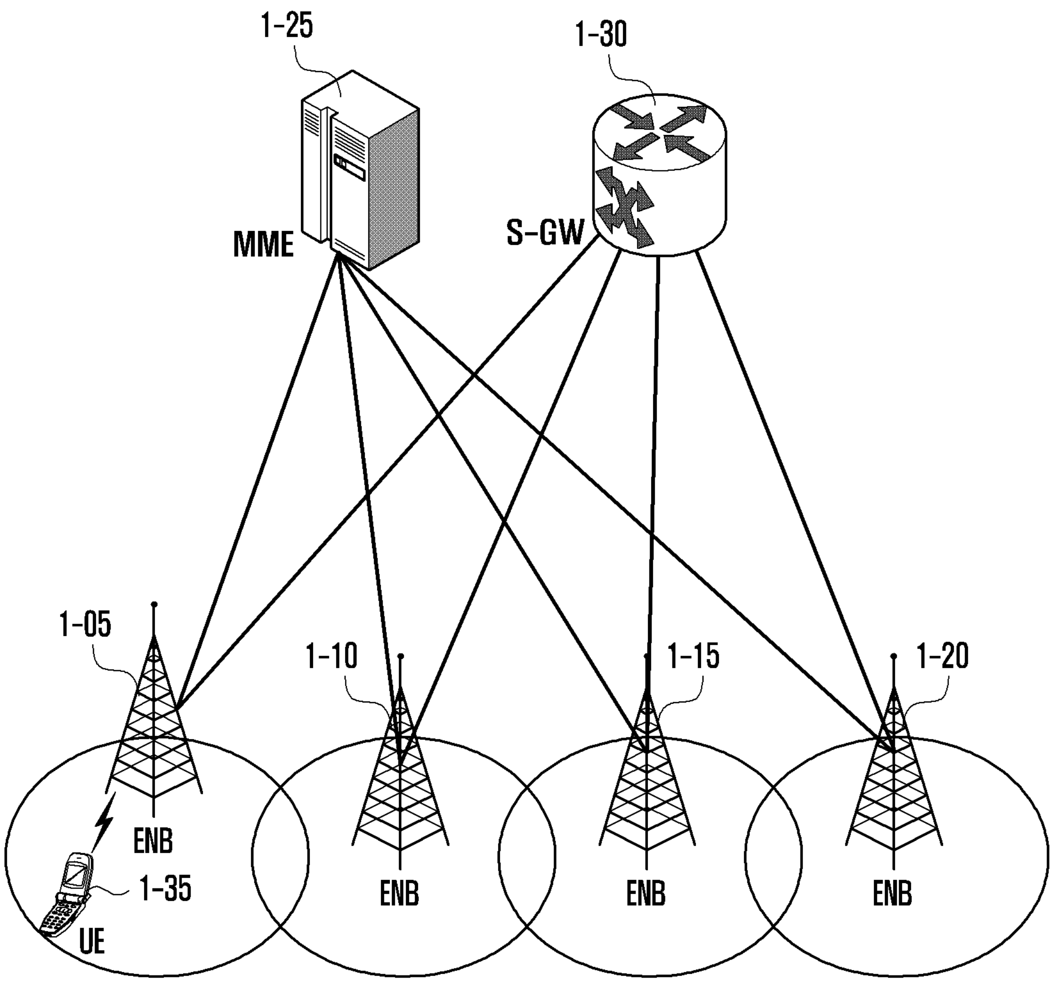
FIG. 1 is a diagram illustrating the architecture of an existing LTE system.

FIG. 1 is a diagram illustrating the architecture of an existing LTE system.

With reference to FIG. 1, as illustrated, the radio access network of the LTE system may be composed of a next-generation base station (evolved node B, ENB, Node B or base station) 1-05, 1-10, 1-15 or 1-20, a mobility management entity (MME) 1-25, and a serving-gateway (S-GW)

1-30. A user equipment (UE or terminal) 1-35 may connect to an external network through the ENB 1-05, 1-10, 1-15 or 1-20 and the S-GW 1-30.

In FIG. 1, the ENBs 1-05, 1-10, 1-15 and 1-20 correspond to existing Node Bs of the universal mobile telecommunication system (UMTS). The ENB is connected to the UE 1-35 through a wireless channel, but performs more complex functions in comparison to the existing Node B. In the LTE system, all user traffic including real-time services like VoIP (Voice over IP) services may be served through shared channels. Hence, an apparatus is needed to perform scheduling on the basis of collected status information regarding buffers, available transmit powers and channels of the UEs, and the ENBs 1-05, 1-10, 1-15 and 1-20 can be responsible for this. One ENB may control multiple cells in a typical situation. To achieve a data rate of, for example, 100 Mbps in a bandwidth of, for example, 20 MHZ, the LTE system may utilize orthogonal frequency division multiplexing (OFDM) as radio access technology. Also, the LTE system may apply adaptive modulation and coding (AMC) to determine the modulation scheme and channel coding rate according to channel states of the UE. The S-GW 1-30 is an entity providing data bearers, and may create and remove data bearers under the control of the MME 1-25. The MME is an entity in charge of various control functions including a mobility management function for the UE, and may be connected to a plurality of ENBs.

Figure 2:
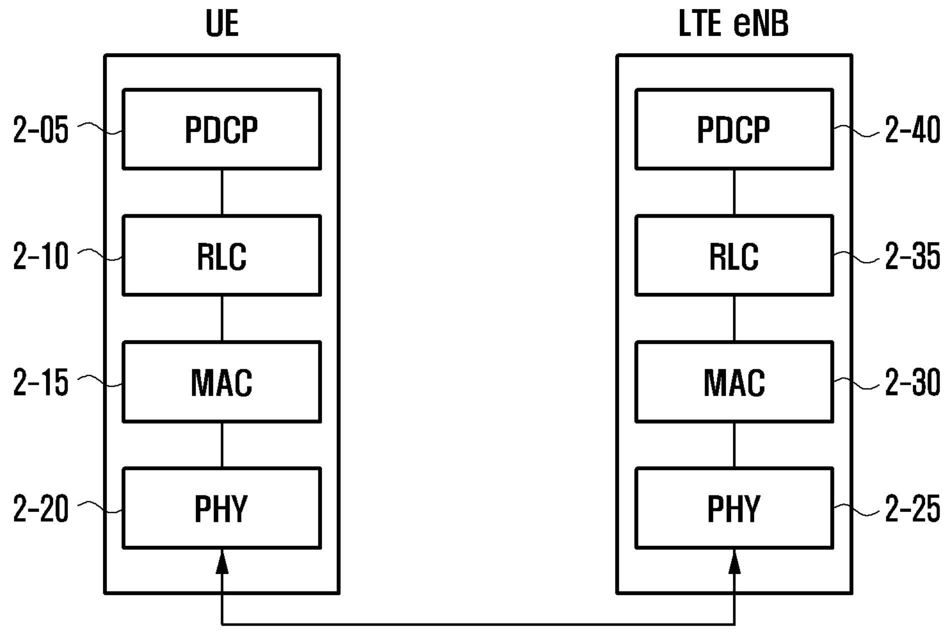
FIG. 2 is a diagram illustrating the structure of radio protocols in the existing LTE system.

FIG. 2 is a diagram illustrating the structure of radio protocols in the existing LTE system.

With reference to FIG. 2, in a UE or an ENB, the radio protocols of the LTE system may be composed of packet data convergence protocol (PDCP) 2-05 or 2-40, radio link control (RLC) 2-10 or 2-35, and medium access control (MAC) 2-15 or 2-30. The PDCP may perform compression and decompression of IP headers. The main functions of the PDCP may be summarized as follows.

- Header compression and decompression function (header compression and decompression: ROHC only)
- User data transfer function (transfer of user data)
- In-sequence delivery function (in-sequence delivery of upper layer PDUs at PDCP re-establishment procedure for RLC AM)
- Reordering function (for split bearers in DC (only support for RLC AM): PDCP PDU routing for transmission and PDCP PDU reordering for reception)
- Duplicate detection function (duplicate detection of lower layer SDUs at PDCP re-establishment procedure for RLC AM)
- Retransmission function (retransmission of PDCP SDUs at handover and, for split bearers in DC, of PDCP PDUs at PDCP data-recovery procedure, for RLC AM)
- Cipher and decipher function (ciphering and deciphering)
- Timer-based SDU discard function (timer-based SDU discard in uplink)

The radio link control (RLC) 2-10 or 2-35 may reconfigure PDCP PDUs (packet data unit) to a suitable size and perform automatic repeat request (ARQ) operation. The main functions of the RLC may be summarized as follows.

- Data transfer function (transfer of upper layer PDUs)
- ARQ function (error correction through ARQ (only for AM data transfer))
- Concatenation, segmentation and reassembly function (concatenation, segmentation and reassembly of RLC SDUs (only for UM and AM data transfer))
- Re-segmentation function (re-segmentation of RLC data PDUs (only for AM data transfer))
- Reordering function (reordering of RLC data PDUs (only for UM and AM data transfer))
- Duplicate detection function (duplicate detection (only for UM and AM data transfer))
- Error detection function (protocol error detection (only for AM data transfer))
- RLC SDU discard function (RLC SDU discard (only for UM and AM data transfer))
- RLC re-establishment function (RLC re-establishment)

The MAC 2-15 or 2-30 may be connected with multiple RLC entities in a UE, and it may multiplex RLC PDUs into MAC PDUs and demultiplex MAC PDUs into RLC PDUs. The main functions of the MAC may be summarized as follows.

- Mapping function (mapping between logical channels and transport channels)
- Multiplexing and demultiplexing function (multiplexing/demultiplexing of MAC SDUs belonging to one or different logical channels into/from transport blocks (TB) delivered to/from the physical layer on transport channels)
- Scheduling information reporting function (scheduling information reporting)
- HARQ function (error correction through HARQ)
- Priority handling function between logical channels (priority handling between logical channels of one UE)
- Priority handling function between UEs (priority handling between UEs by means of dynamic scheduling)
- MBMS service identification function (MBMS service identification)
- Transport format selection function (transport format selection)
- Padding function (padding)

The physical (PHY) layer 2-20 or 2-25 may convert higher layer data into OFDM symbols by means of channel coding and modulation and transmits the OFDM symbols through a wireless channel, or it may demodulate OFDM symbols received through a wireless channel, perform channel decoding, and forward the result to a higher layer.

Figure 3:
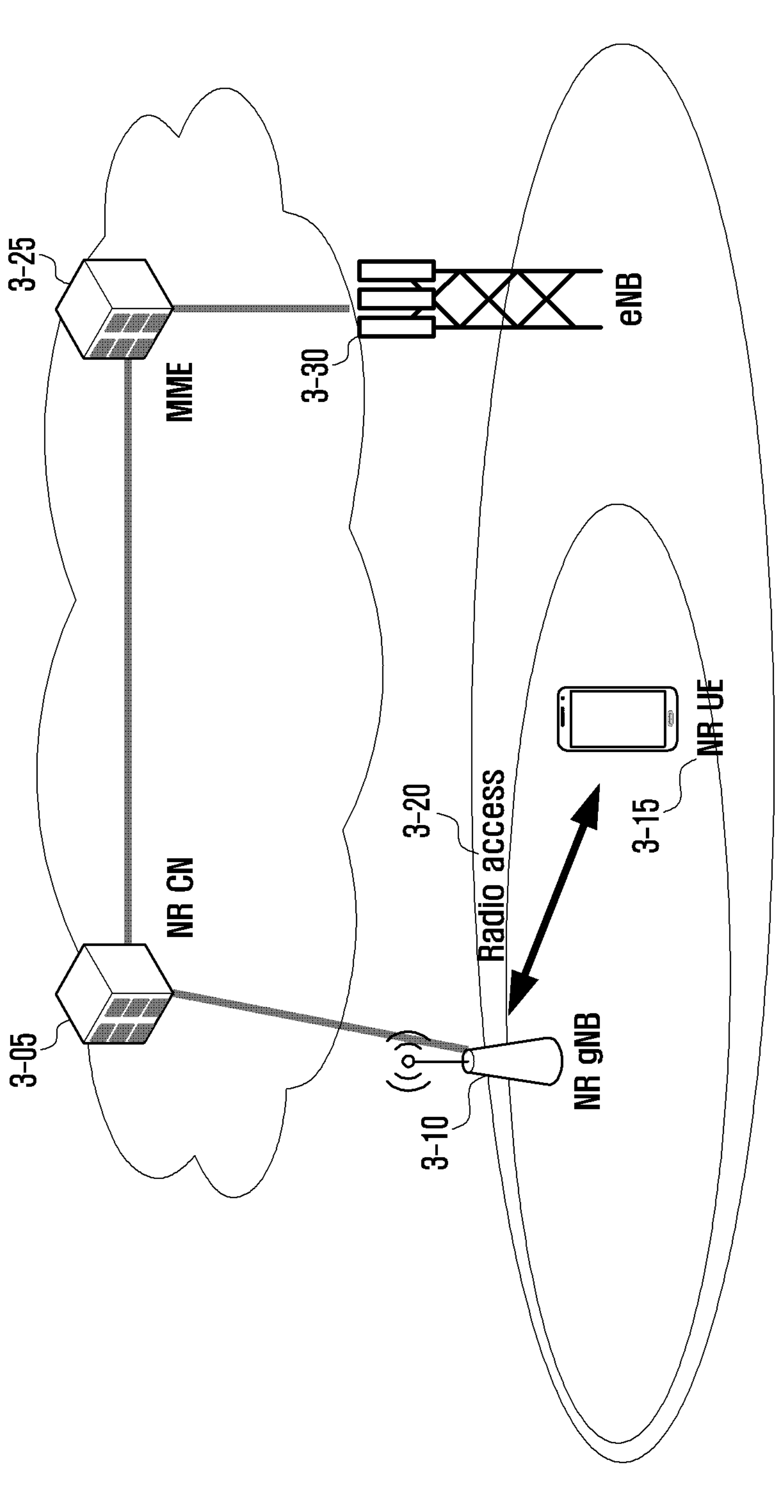
FIG. 3 is a diagram showing the architecture of a next-generation mobile communication system, to which the disclosure can be applied.

FIG. 3 is a diagram showing the architecture of a next-generation mobile communication system.

With reference to FIG. 3, the radio access network of a next-generation mobile communication system (hereinafter, NR or 5g) may be composed of a new radio node B (hereinafter, NR gNB or NR base station) 3-10 and a new radio core network (NR CN) 3-05. A new radio user equipment (hereinafter, NR UE or terminal) 3-15 may connect to an external network through the NR gNB 3-10 and the NR CN 3-05.

In FIG. 3, the NR gNB 3-10 may correspond to an evolved node B (eNB) of the existing LTE system. The NR gNB may be connected to the NR UE 3-15 through a radio channel, and it can provide a more superior service than that of the existing node B. All user traffic may be serviced through shared channels in the next-generation mobile communication system. Hence, there is a need for an entity that performs scheduling by collecting status information, such as buffer states, available transmission power states, and channel states of individual UEs, and the NR NB 3-10 may take charge of this. One NR gNB may control a plurality of cells. To implement ultra-high-speed data transmission compared with current LTE, a bandwidth beyond the existing maximum bandwidth may be utilized. Also, a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE may be applied. The NR CN 3-05 may perform functions such as mobility support, bearer configuration, and quality of service (QOS) configuration. The NR CN is an entity taking charge of not only mobility management but also various control functions for the UE, and may be connected to a plurality of base stations. In addition, the next-generation mobile communication system may interwork with the existing LTE system, and the NR CN may be connected to the MME 3-25 through a network interface. The MME may be connected to an eNB 3-30 being an existing base station.

Figure 4:
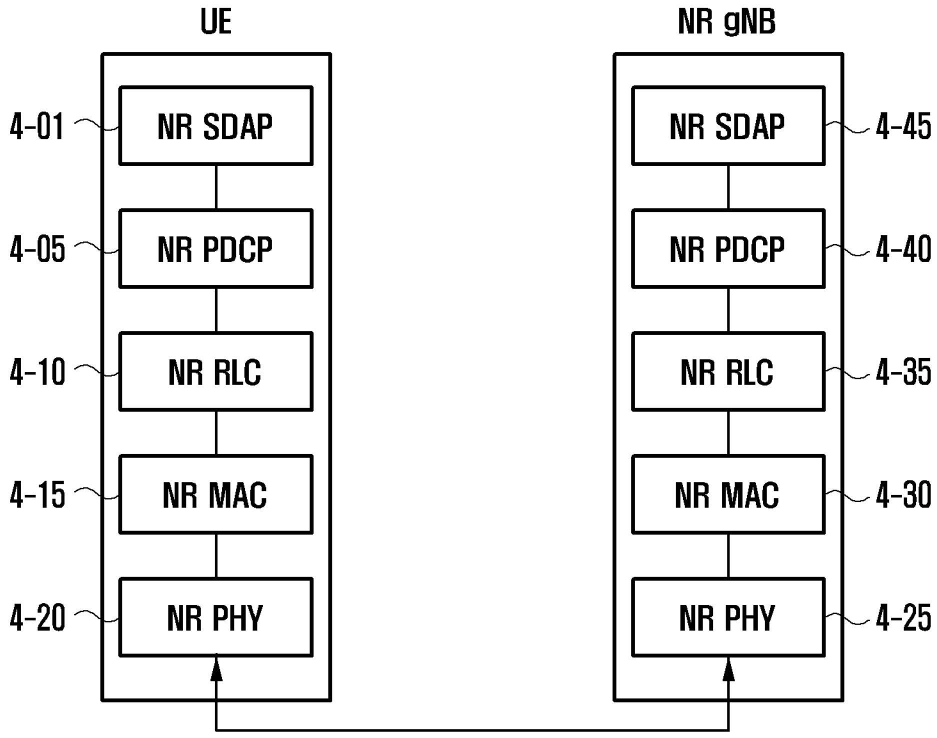
FIG. 4 is a diagram illustrating the structure of radio protocols in the next-generation mobile communication system, to which the disclosure can be applied.

FIG. 4 is a diagram illustrating the structure of radio protocols in the next-generation mobile communication system, to which the disclosure can be applied.

With reference to FIG. 4, in a UE or an NR gNB, the radio protocols of the next-generation mobile communication system are composed of NR service data adaptation protocol (SDAP) 4-01 or 4-45, NR PDCP 4-05 or 4-40, NR RLC 4-10 or 4-35, and NR MAC 4-15 or 4-30.

The main functions of the NR SDAP 4-01 or 4-45 may include some of the following functions.

User data transfer function (transfer of user plane data)

Mapping function between QoS flow and data bearer for uplink and downlink (mapping between a QoS flow and a DRB for both DL and UL)

QoS flow ID marking function for uplink and downlink (marking QoS flow ID in both DL packets and UL packets)

Function of mapping reflective QoS flow to data bearer for uplink SDAP PDUs (reflective QoS flow to DRB mapping for the UL SDAP PDUs)

With respect to the SDAP entity, the UE may be configured with, through a radio resource control (RRC) message, whether to use a header of the SDAP entity or whether to use a function of the SDAP entity for each PDCP entity, bearer, or logical channel. If a SDAP header is configured, the SDAP entity may use a NAS (non-access stratum) reflective QoS 1-bit indication and AS (access stratum) reflective QoS 1-bit indication of the SDAP header to instruct the UE to update or reconfigure the mapping information between QoS flows and data bearers for the uplink and downlink. The SDAP header may include QoS flow ID information indicating the QoS. The QoS information may be used as data processing priority and scheduling information for supporting smooth services.

The main function of the NR PDCP 4-05 or 4-40 may include some of the following functions.

Header compression and decompression function (header compression and decompression: ROHC only)

User data transfer function (transfer of user data)

In-sequence delivery function (in-sequence delivery of upper layer PDUs)

Out-of-sequence delivery function (out-of-sequence delivery of upper layer PDUs)

Reordering function (PDCP PDU reordering for reception)

Duplicate detection function (duplicate detection of lower layer SDUs)

Retransmission function (retransmission of PDCP SDUs)

Cipher and decipher function (ciphering and deciphering)

Timer-based SDU discard function (timer-based SDU discard in uplink)

In the above description, the reordering function of the NR PDCP entity may mean reordering of PDCP PDUs received from a lower layer in order based on the PDCP sequence number (SN). The reordering function of the NR PDCP entity may include delivering data to an upper layer in reordered sequence, directly delivering data without considering the order, recording lost PDCP PDUs through reordering, reporting the status of lost PDCP PDUs to the transmitting side, or requesting retransmission of the lost PDCP PDUs.

The main function of the NR RLC 4-10 or 4-35 may include some of the following functions.

Data transfer function (transfer of upper layer PDUs)

In-sequence delivery function (in-sequence delivery of upper layer PDUs)

Out-of-sequence delivery function (out-of-sequence delivery of upper layer PDUs)

ARQ function (error correction through ARQ)

Concatenation, segmentation and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU discard function (RLC SDU discard)

RLC re-establishment function (RLC re-establishment)

In the above description, in-sequence delivery of the NR RLC device may mean in-sequence delivery of RLC SDUs received from a lower layer to an upper layer. In-sequence delivery of the NR RLC device may include reassembly and delivery of RLC SDUs when several RLC SDUs belonging to one original RLC SDU are received after segmentation.

In-sequence delivery of the NR RLC device may include reordering of received RLC PDUs based on the RLC sequence number (SN) or the PDCP SN, recording lost RLC PDUs through reordering, reporting the status of the lost RLC PDUs to the transmitting side, and requesting retransmission of the lost RLC PDUs.

If there is a lost RLC SDU, in-sequence delivery of the NR RLC device may include in-sequence delivery of only RLC SDUs before the lost RLC SDU to an upper layer.

Although there is a lost RLC SDU, if a specified timer has expired, in-sequence delivery of the NR RLC device may include in-sequence delivery of all the RLC SDUs received before the starting of the timer to an upper layer.

Although there is a lost RLC SDU, if a specified timer has expired, in-sequence delivery of the NR RLC device may include in-sequence delivery of all the RLC SDUs received up to now to an upper layer.

The NR RLC device may process RLC PDUs in the order of reception regardless of the order of the sequence number, and transfer them to the NR PDCP entity in an out-of-sequence delivery manner.

In case of receiving a segment, the NR RLC device may reconstruct one whole RLC PDU from segments stored in the buffer or received later, and transfer it to the NR PDCP device.

The NR RLC layer may not include a concatenation function, which may be performed by the NR MAC layer or may be replaced with a multiplexing function of the NR MAC layer.

In the above description, out-of-sequence delivery of the NR RLC device may mean a function of transferring RLC SDUs received from a lower layer directly to a higher layer regardless of their order. If several RLC SDUs belonging to one original RLC SDU are received after segmentation, out-of-sequence delivery of the NR RLC device may include reassembly and delivery of the RLC SDUs. Out-of-sequence delivery of the NR RLC device may include storing the RLC SNs or PDCP SNs of received RLC PDUs and ordering them to record lost RLC PDUs.

The NR MAC 4-15 or 4-30 may be connected to several NR RLC layer devices configured in one UE, and the main function of the NR MAC may include some of the following functions.

- Mapping function (mapping between logical channels and transport channels)
- Multiplexing and demultiplexing function (multiplexing/demultiplexing of MAC SDUs)
- Scheduling information reporting function (scheduling information reporting)
- HARQ function (error correction through HARQ)
- Priority handling function between logical channels (priority handling between logical channels of one UE)
- Priority handling function between UEs (priority handling between UEs by means of dynamic scheduling)
- MBMS service identification function (MBMS service identification)
- Transport format selection function (transport format selection)
- Padding function (padding)

The NR PHY layers 4-20 or 4-25 may compose OFDM symbols from higher layer data through channel coding and modulation and transmit them through a radio channel, or may demodulate and channel-decode OFDM symbols received through a radio channel and forward the result to a higher layer.

Figure 5:
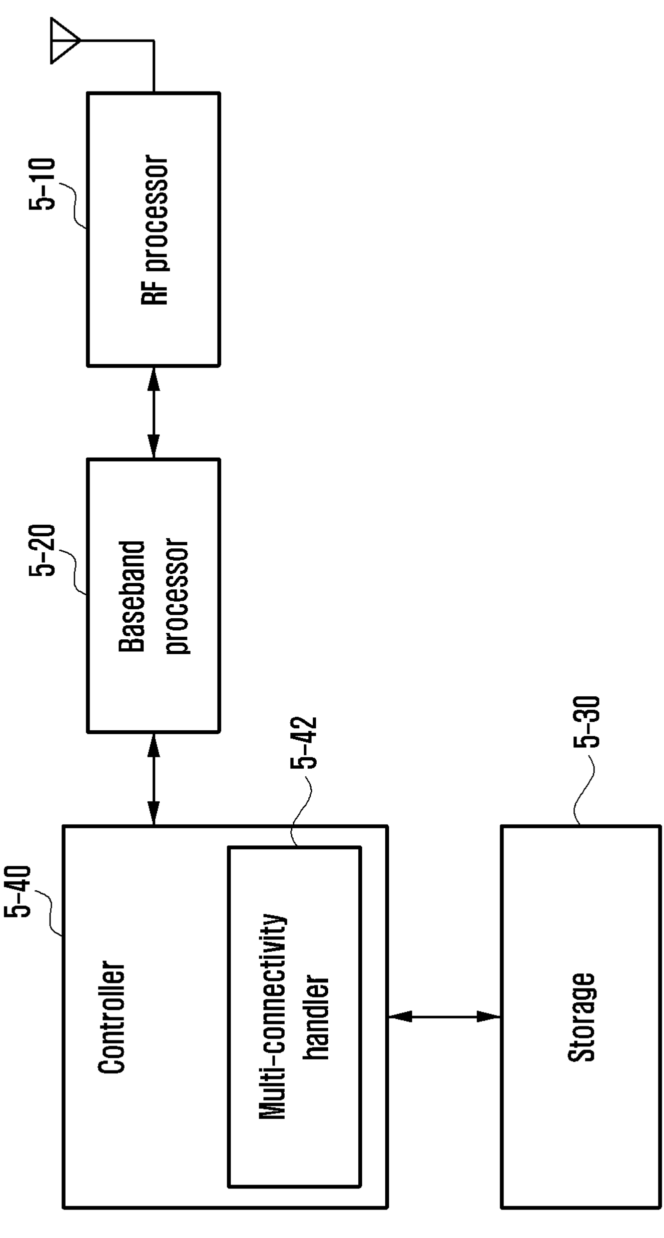
FIG. 5 is a block diagram showing the internal structure of a user equipment, to which the disclosure is applied.

FIG. 5 is a block diagram showing the internal structure of a user equipment, to which the disclosure is applied.

With reference to the drawing, the UE includes a radio frequency (RF) processor 5-10, a baseband processor 5-20, a storage 5-30, and a controller 5-40.

The RF processor 5-10 performs a function for transmitting and receiving a signal through a radio channel, such as signal band conversion and amplification. That is, the RF processor 5-10 performs up-conversion of a baseband signal provided from the baseband processor 5-20 into an RF-band signal and transmits it through an antenna, and performs down-conversion of an RF-band signal received through an antenna into a baseband signal. For example, the RF processor 5-10 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Also, the RF processor 5-10 may include a plurality of RF chains. Further, the RF processor 5-10 may perform beamforming. For beamforming, the RF processor 5-10 may adjust phases and magnitudes of signals transmitted and received through the plural antennas or antenna elements. Further, the RF processor may perform MIMO, and may receive several layers during a MIMO operation.

The baseband processor 5-20 performs conversion between a baseband signal and a bit string in accordance with the physical layer specification of the system. For example, during data transmission, the baseband processor 5-20 generates complex symbols by encoding and modulating a transmission bit string. Further, during data reception, the baseband processor 5-20 restores a reception bit string by demodulating and decoding a baseband signal provided from the RF processor 5-10. For example, in the case of utilizing orthogonal frequency division multiplexing (OFDM), for data transmission, the baseband processor 5-20 generates complex symbols by encoding and modulating a transmission bit string, maps the complex symbols to subcarriers, and composes OFDM symbols through inverse fast Fourier transform (IFFT) operation and cyclic prefix (CP) insertion. Further, for data reception, the baseband processor 5-20 divides a baseband signal provided from the RF processor 5-10 in units of OFDM symbols, restores the signals mapped to subcarriers through fast Fourier transform (FFT) operation, and restores the reception bit string through demodulation and decoding.

The baseband processor 5-20 and the RF processor 5-10 transmit and receive signals as described above. Hence, the baseband processor 5-20 and the RF processor 5-10 may be called a transmitter, a receiver, a transceiver, or a communication unit. Further, to support different radio access technologies, at least one of the baseband processor 5-20 or the RF processor 5-10 may include a plurality of communication modules. In addition, to process signals of different frequency bands, at least one of the baseband processor 5-20 or the RF processor 5-10 may include different communication modules. For example, the different radio access technologies may include a wireless LAN (e.g., IEEE 802.11), a cellular network (e.g., LTE), and the like. In addition, the different frequency bands may include a super high frequency (SHF) band and a millimeter wave (mmWave) band (e.g., 60 GHZ).

The storage 5-30 stores data such as basic programs, application programs, and configuration information for the operation of the UE. In particular, the storage 5-30 may store information about a second access node that performs wireless communication using a second radio access technology. The storage 5-30 provides stored data in response to a request from the controller 5-40.

The controller 5-40 controls the overall operation of the UE. For example, the controller 5-40 transmits and receives signals through the baseband processor 5-20 and the RF processor 5-10. Further, the controller 5-40 writes or reads data to or from the storage 5-40. To this end, the controller 5-40 may include at least one processor. For example, the controller 5-40 may include a communication processor (CP) for controlling communication and an application processor (AP) for controlling higher layers such as application programs.

FIG. 6 is a block diagram showing the constitution of an NR base station according to the disclosure.

As shown in the drawing, the base station includes an RF processor 6-10, a baseband processor 6-20, a backhaul communication unit 6-30, a storage 6-40, and a controller 6-50.

The RF processor 6-10 performs a function for transmitting and receiving a signal through a radio channel, such as signal band conversion and amplification. That is, the RF processor 6-10 performs up-conversion of a baseband signal provided from the baseband processor 6-20 into an RF-band signal and transmits the converted signal through an antenna, and performs down-conversion of an RF-band signal received through an antenna into a baseband signal. For example, the RF processor 6-10 may include a transmission filter, a reception filter, an amplifier, a mixer, an oscillator, a DAC, and an ADC. Although only one antenna is illustrated in the drawing, the first access node may be provided with a plurality of antennas. Additionally, the RF processor 6-10 may include a plurality of RF chains. Further, the RF processor 6-10 may perform beamforming. For beamforming, the RF processor 6-10 may adjust phases and amplitudes of signals transmitted and received through plural antennas or antenna elements. The RF processor may perform downlink MIMO operation by transmitting one or more layers.

The baseband processor 6-20 performs conversion between a baseband signal and a bit string in accordance with the physical layer specification of a first radio access technology. For example, for data transmission, the baseband processor 6-20 generates complex symbols by encoding and modulating a transmission bit string. Further, for data reception, the baseband processor 6-20 restores a reception bit string by demodulating and decoding a baseband signal provided from the RF processor 6-10. For example, in the case of utilizing OFDM, for data transmission, the baseband processor 6-20 generates complex symbols by encoding and modulating a transmission bit string, maps the complex symbols to subcarriers, and composes OFDM symbols through IFFT operation and CP insertion. Further, for data reception, the baseband processor 6-20 divides a baseband signal provided from the RF processor 6-10 in units of OFDM symbols, restores the signals mapped to subcarriers through FFT operation, and restores the reception bit string through demodulation and decoding. The baseband processor 6-20 and the RF processor 6-10 transmit and receive signals as described above. Hence, the baseband processor 6-20 and the RF processor 6-10 may be called a transmitter, a receiver, a transceiver, a communication unit, or a wireless communication unit.

The backhaul communication unit 6-30 provides an interface for communication with other nodes in the network. That is, the backhaul communication unit 6-30 converts a bit string, which is to be transmitted from the primary base station to another node, for example, a secondary base station or the core network, into a physical signal, and converts a physical signal received from another node into a bit string.

The storage 6-40 stores data such as basic programs, application programs, and configuration information for the operation of the primary base station. In particular, the storage 6-40 may store information on a bearer allocated to a connected UE and measurement results reported from the connected UE. Further, the storage 6-40 may store information used as a criterion for determining whether to provide or suspend multi-connectivity to the UE. In addition, the storage 6-40 provides stored data in response to a request from the controller 6-50.

The controller 6-50 controls the overall operation of the primary base station. For example, the controller 6-50 transmits and receives signals through the baseband processor 6-20 and the RF processor 6-10 or through the backhaul communication unit 6-30. Further, the controller 6-50 writes or reads data to or from the storage 6-40. To this end, the controller 6-50 may include at least one processor.

In the disclosure, IAB means "integrated access and backhaul."

MT being "mobile termination" is a part of an IAB node responsible for communication with a parent node.

DU is an abbreviation for "distributed unit" and is a part of an IAB node responsible for transmission/reception functions with a child node and a regular UE connected to the IAB node.

CU is an abbreviation for "central unit" and means a logical node hosting RRC and higher layer L2 protocol (PDCP), and it can control the operation of one or more DUs.

BAP is an abbreviation for "backhaul adaptation protocol" and is a layer present in the MT/DU of an IAB node.

Figure 7:
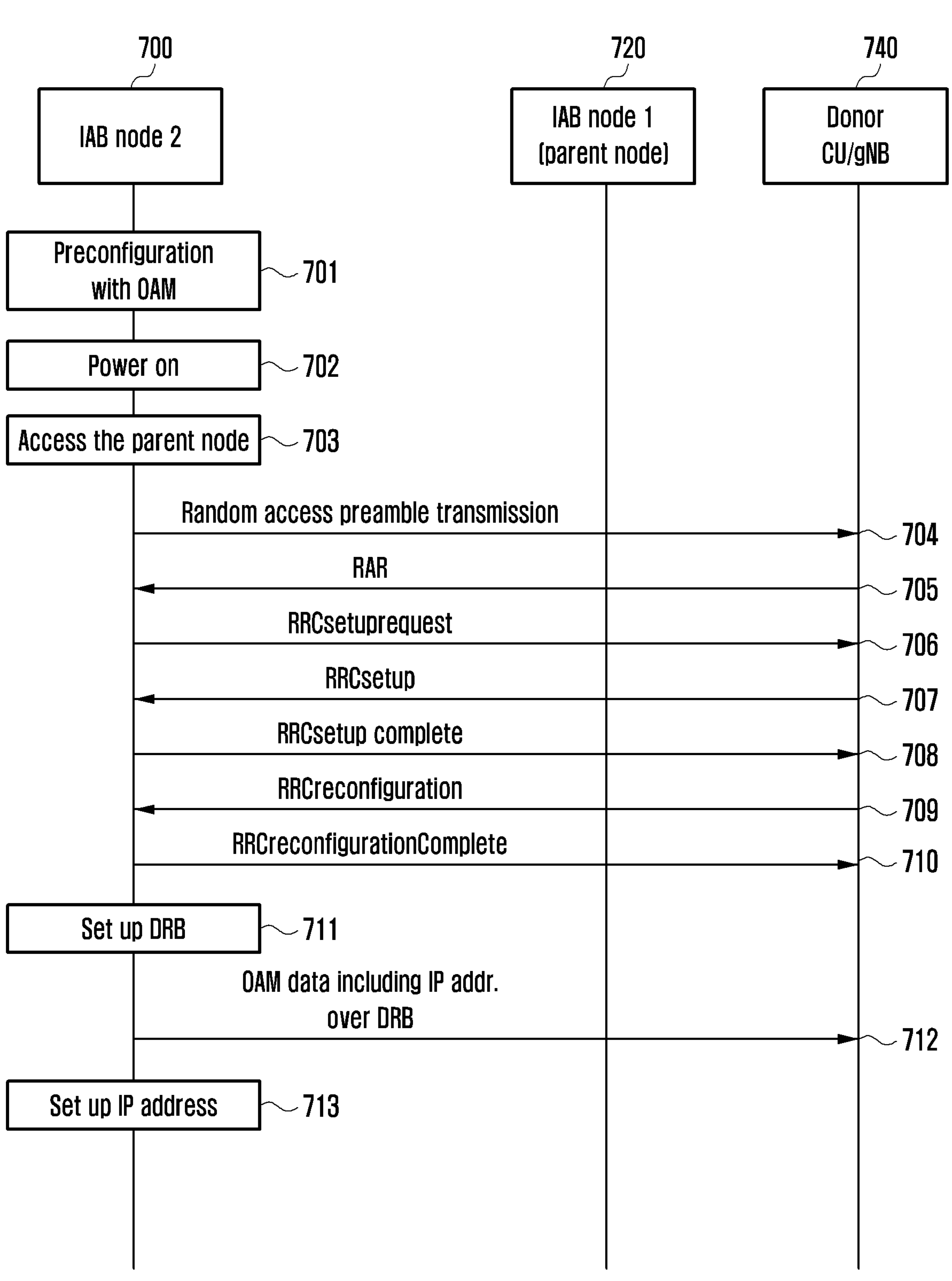
FIG. 7 is a diagram illustrating a case in which IP address allocation of the DU part of an IAB node is pre-configured to be performed by use of the OAM.

FIG. 7 is a diagram illustrating a case in which IP address allocation of the DU part of an integrated access and backhaul (IAB) node is pre-configured to be performed by use of administration and maintenance (OAM).

Specifically, FIG. 7 is a case in which IAB node 2 (700) selects IAB node 1 (720) as a parent node and performs connection setup. It may be configured in advance so that IP address allocation of the DU of IAB node 2 (700) is performed by use of the OAM (step 701). Hence, after IAB node 2 (700) completes the RRC connection (steps 702 to 708) and performs RRCreconfiguration message transmission and reception (steps 709 and 710) to set up a data radio bearer (DRB) (step 711), it may download OAM data from the OAM server (step 712). IAB node 2 (700) may retrieve an IP address to be allocated to the DU from the downloaded OAM data, and may set up the corresponding address to the DU (step 713).

Figure 8:
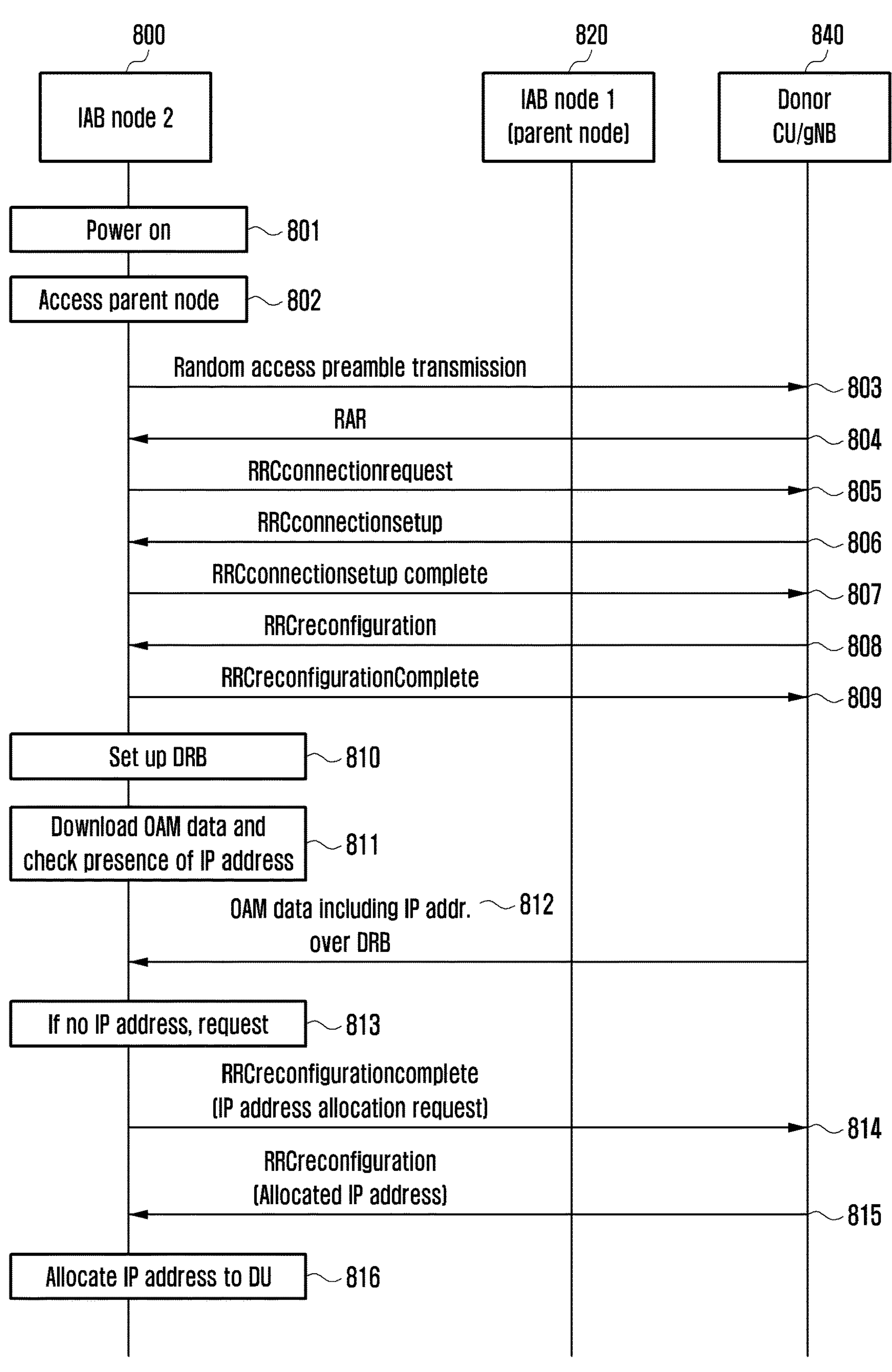
FIG. 8 is a diagram illustrating a case in which IP address allocation of the DU part of an IAB node is not pre-configured to be performed by use of the OAM through a DRB after connection setup.

FIG. 8 is a diagram illustrating a case in which IP address allocation of the DU part of an IAB node is not pre-configured to be performed by use of the OAM through a data radio bearer (DRB) after connection setup.

Specifically, FIG. 8 is a case in which IAB node 2 (800) selects IAB node 1 (820) as a parent node and performs connection setup. After IAB node 2 (800) completes RRC connection setup (steps 801 to 807) and performs RRCreconfiguration message transmission and reception (steps 808 and 809) to set up a DRB (step 810), it may download OAM data from the OAM server. Since IP address allocation via the OAM is not configured in advance, IAB node 2 (800) may identify whether an IP address to be allocated to the DU is present in the downloaded OAM data (step 811). If present, IAB node 2 (800) may retrieve the corresponding address and set up it to the DU (step 812).

However, if an IP address is not present in the OAM data as shown in FIG. 8, the mobile termination (MT) of IAB node 2 (800) may request the donor centralized unit (CU) 840 to allocate an IP address through an RRC message (step 813). When the above message is delivered to the donor CU 840 through IAB node 1 (820) (step 814), the donor CU 840 may allocate a new IP address and transmit it to the MT of IAB node 2 (800) through IAB node 1 (820) again by use of an RRC message (step 815). Based on the received message, the MT of IAB node 2 (800) may allocate an IP address to the DU (step 816). A message that can be used when requesting an IP address may be an RRCreconfigurationComplete message, a ULInformationTransfer message, or a new UL RRC message. Additionally, a message that the donor CU 840 receiving a request can use to allocate an IP address to the MT of IAB node 2 (800) may be an RRCreconfiguration message, a DLInformationTransfer message, or a new DL RRC message. The following are possible pairs of an RRC message used for IP address requesting and an RRC message used for IP address allocation, but any combination of the above messages may be used for a request and allocation pair without being limited thereto. For instance, it may be as shown in Table 1 below.

TABLE 1

| | Request | Allocation |
|---|---|---|
| Possible pair 1 | RRCreconfigurationComplete | RRCreconfiguration message immediately after request |
| 2 | RRCreconfigurationComplete | DLinformationTransfer |
| 3 | ULInformationTransfer | DLinformationTransfer |
| 4 | RRCreconfigurationComplete | RRCReconfiguration |
| 5 | ULInformationTransfer | New DL RRC message |
| 6 | New UL RRC message | New DL RRC message |

When receiving an IP address, the RRC message used for allocation can be divided into an MCG part and an SCG part;

when the connection is performed via single connectivity, the IP address can be signaled at the MCG part.

Figure 9:
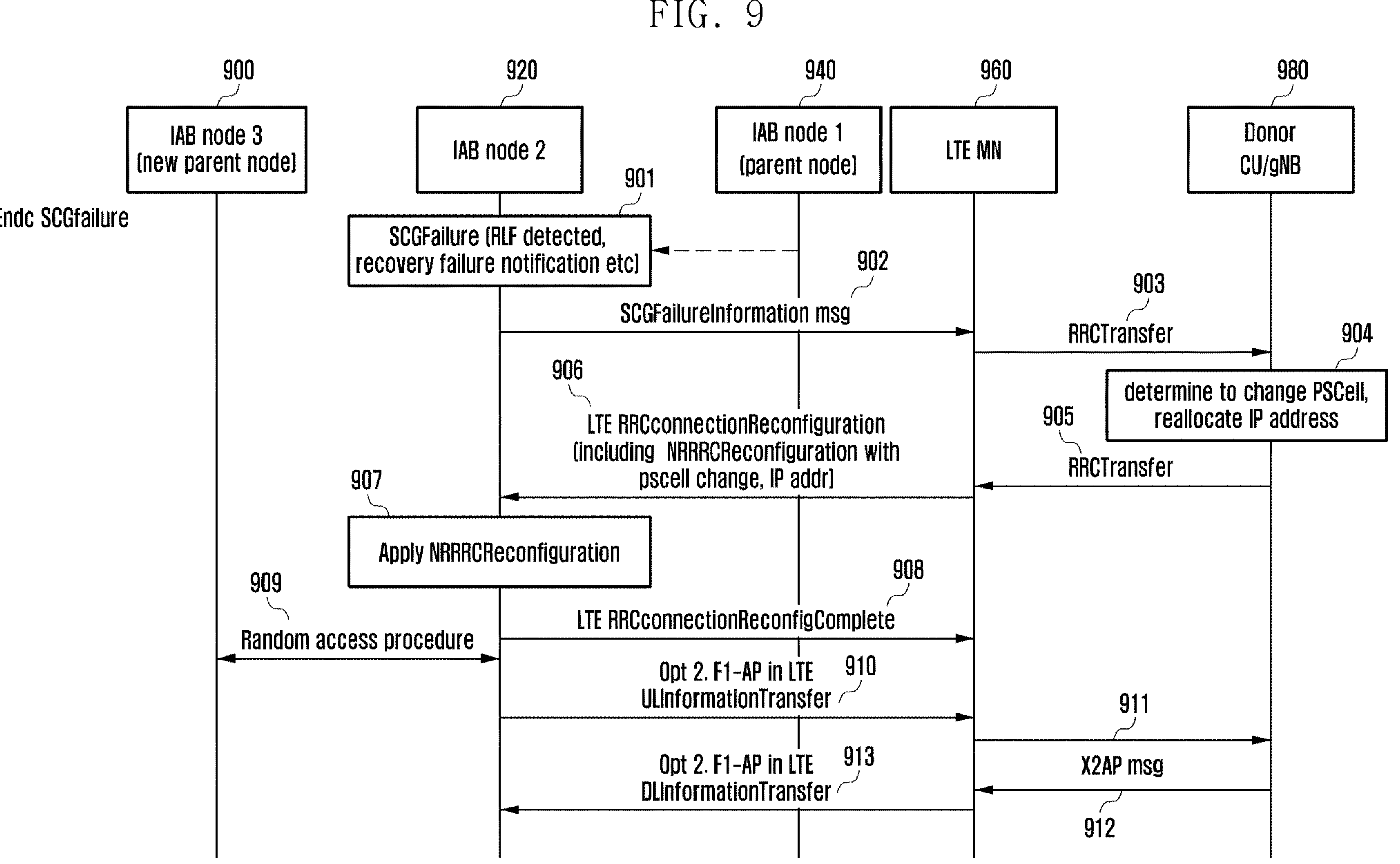
FIG. 9 is a diagram illustrating IP address allocation in response to a SCGfailure in case of EN-DC.

FIG. 9 is a diagram illustrating IP address allocation in response to a SCGfailure in case of E-UTRAN new radio-dual connectivity (EN-DC).

IAB node 2 (920) is connected to IAB node 1 (940) being a parent node acting as a secondary node (SN) and is connected to an LTE eNB 960 acting as a master node (MN). When the MT of IAB node 2 (920) detects a radio link failure (RLF) in the link of IAB node 1 (940) or receives an RLF notification from IAB node 1 (940), or a PSCell change failure occurs (step 901), it may transmit a SCGFailureInformation message to the MN 960 through an LTE link (step 902). The MN 960 may transmit a SCGFailure related report to the donor CU 980 (step 903). The donor CU 980 may determine to change the PSCell to a new PSCell, compose a corresponding RRC message (handover command), identify the donor DU connected to the determined new PSCell, and, if it being different from the previously connected donor DU, allocate a new IP address (step 904). The allocated address may be included in the handover command and delivered to the LTE MN 960 (step 905). The MN 960 may transmit an LTE RRCconnectionReconfiguration message including the corresponding RRC message, that is, NR RRCreconfiguration message, to IAB node 2 (920) (step 906). Upon receiving the above message, the MT of IAB node 2 (920) may apply the corresponding NR RRCreconfiguration message (step 907), and may also set up the IP address included therein to the DU at this time. Thereafter, IAB node 2 (920) may transmit an LTE RRCconnectionReconfigurationComplete message to the LTE MN 960 (step 908). Then, IAB node 2 (920) may perform a random access process with IAB node 3 (900) (step 909).

As another embodiment, after applying NRRRCreconfiguration, information for requesting an IP address may be included in the F1-AP container in LTE ULInformationTransfer MRDC message, which is then transmitted to the LTE MN 960 (step 910). Upon receiving this, the LTE MN 960 may transmit the request information to the donor gNB 980 (step 911), and if there is a need to allocate a new IP address, the donor gNB 980 may allocate a new IP address and transmit it back to the LTE MN 960 (step 912). The LTE MN 960 may include the IP address in the f1-AP container in DLInformationTransfer MRDC message, which is then transmitted to the MT of IAB node 2 (920) (step 913).

FIG. 10 is a diagram illustrating IP address allocation in response to a link failure in case of NR single connectivity.

IAB node 2 (1040) is connected to IAB node 1 (1060) acting as a parent node. When the MT of IAB node 2 (1040) detects an RLF at the link of IAB node 1 (1060) or receives an RLF recovery failure notification from IAB node 1 (1060) (step 1001), the MT of IAB node 2 (1040) may perform cell selection, perform a random access procedure with the selected cell (step 1002), and perform RRC re-establishment (step 1003). In this case, the donor CU 1000 may recognize newly connecting IAB node 2 (1040) and allocate a new IP address related to newly selected IAB node 3 (1020) to IAB node 2 (1040) (step 1004). Here, the IP address may be included in a container corresponding to the MCG by using an RRC re-establishment message (step 1005). Upon receiving the above message, IAB node 2 (1040) may allocate the received IP address to the DU (step 1006). Then, IAB node 2 (1040) may transmit an RRC re-establishment complete message to IAB node 3 (1020) (step 1007).

In another embodiment, without allocating an IP address through RRC re-establishment, when IAB node 2 (1040) receives RRC re-establishment and transmits a complete message for it, the donor CU 1000 may allocate an IP address (step 1008), include the IP address in an RRC reconfiguration message, and transmit it to IAB node 2 (1040) via IAB node 3 (1020) (step 1009). Upon receiving this information, IAB node 2 (1040) may allocate the corresponding information to the DU (step 1010). Thereafter, IAB node 2 (1040) may transmit an RRC re-establishment complete message to IAB node 3 (1020) (step 1011).

Figure 11:
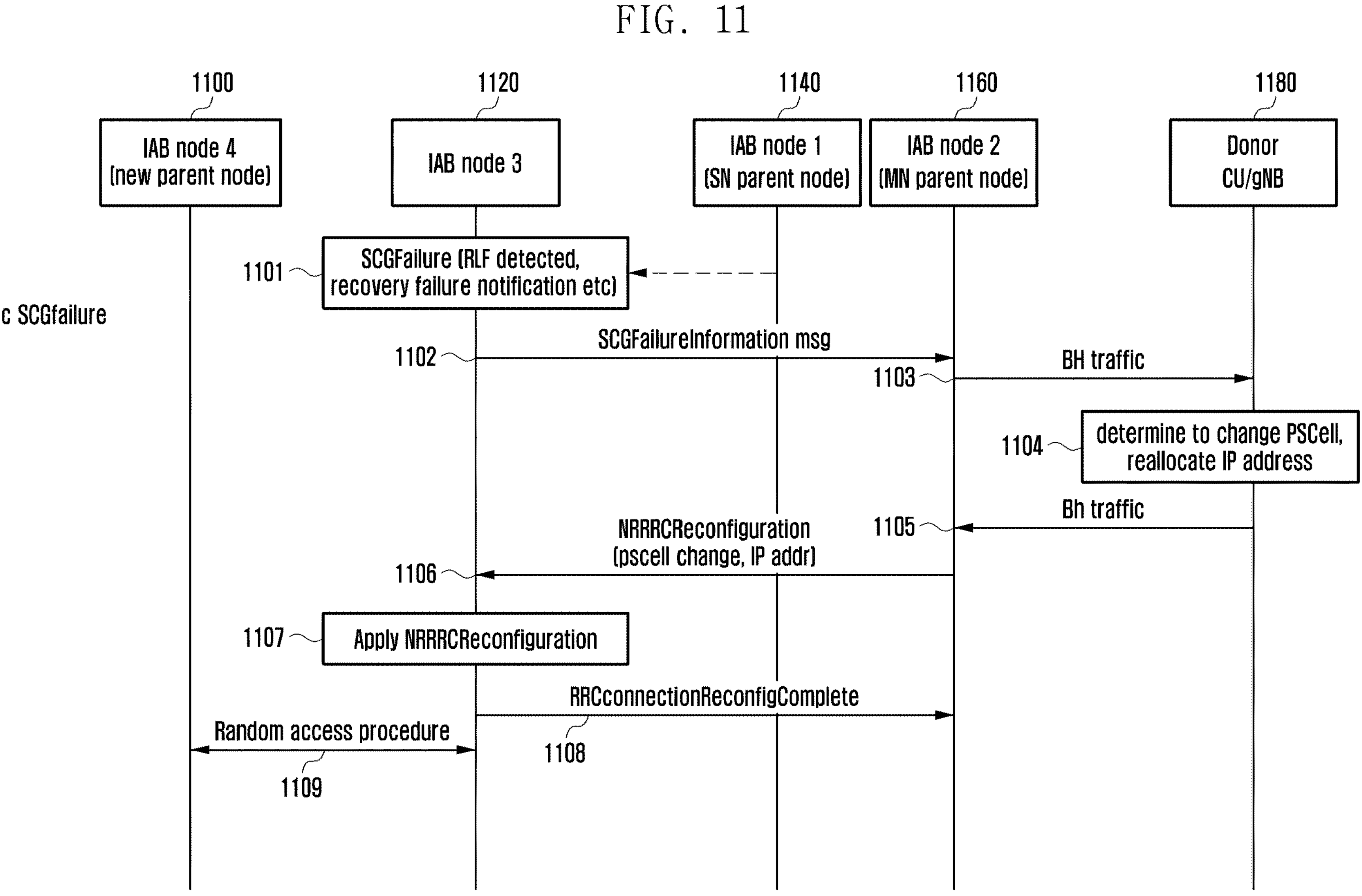
FIG. 11 is a diagram illustrating IP address allocation in response to a SCGfailure in case of NR-DC.

FIG. 11 is a diagram illustrating IP address allocation in response to a SCGfailure in case of new radio-dual connectivity (NR-DC).

IAB node 3 (1120) is connected to IAB node 1 (1140) acting as an SN parent node, and is connected to IAB node 2 (1160) acting as an MN parent node. When the MT of IAB node 3 (1120) detects an RLF in the link of IAB node 1 (1140) or receives RLF notification from IAB node 1 (1140), or a PSCell change failure occurs (step 1101), it may transmit a SCGFailureInformation message to IAB node 2 (1160) through the MN link (step 1102). IAB node 2 (1160) may transmit a SCGFailure related report to the donor CU 1180 (step 1103). The donor CU 1180 may determine to change the PSCell to another PSCell, compose a corresponding RRC message (handover command), identify the donor DU 1180 connected to the determined new PSCell, and, if it being different from the previously connected donor DU 1180, allocate a new IP address (step 1104). The allocated address may be included in the handover command and delivered to IAB node 2 (1160) (step 1105). That is, here, a NR RRCreconfiguration message may be transmitted to IAB node 2 (1160). Upon receiving the above message, IAB node 2 (1160) may forward it to IAB node 3 (1120) (step 1106). The MT of IAB node 3 (1120) may apply the corresponding NR RRCreconfiguration message (step 1107), and may also set up the IP address included therein to the DU at this time. In this case, the IP address may be signaled by being included in the SCG part of RRCreconfiguration. Then, IAB node 3 (1120) may transmit an RRCconnectionReconfigurationComplete message to IAB node 2 (1160) (step 1108). Thereafter, IAB node 3 (1120) may perform a random access process with IAB node 4 (1100) (step 1109).

Figure 12:
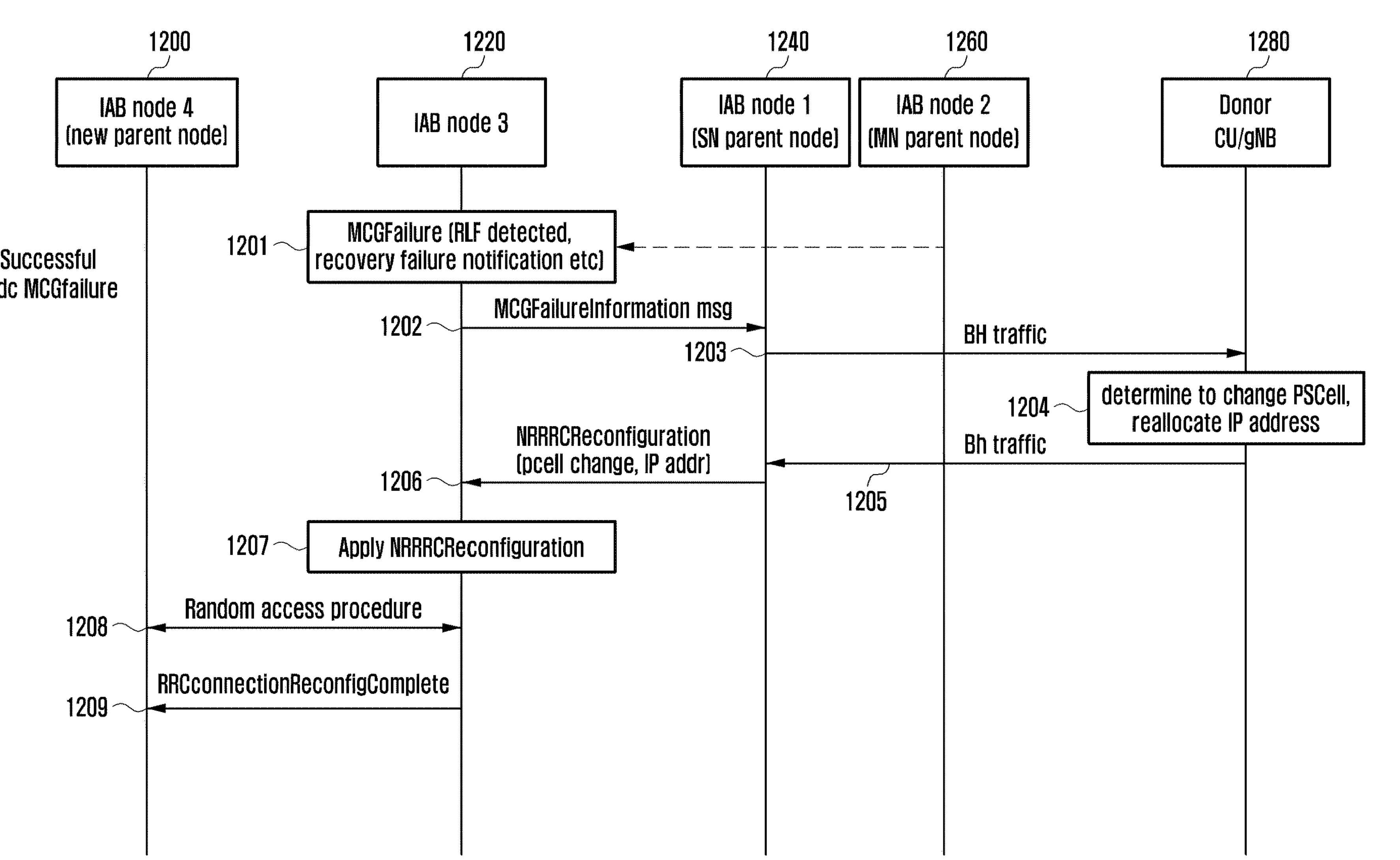
FIG. 12 is a diagram illustrating IP address allocation when the MCGfailure procedure is successful in case of NR-DC.

FIG. 12 is a diagram illustrating IP address allocation when the MCGfailure procedure is successful in case of NR-DC.

IAB node 3 (1220) is connected to IAB node 1 (1240) acting as an SN parent node and is connected to IAB node 2 (1260) acting as an MN parent node. When the MT of IAB node 3 (1220) detects an RLF in the link of IAB node 2 (1260) or receives an RLF notification from IAB node 2 (1260), or a PCell change failure occurs (step 1201), it may transmit a MCGFailureInformation message to IAB node 1 (1240) through the SN link (step 1202). IAB node 1 (1240) may transmit a MCGFailure-related report to the donor CU 1280 (step 1203). The donor CU 1280 may determine to change the PCell to another PCell (handover), compose a corresponding RRC message (handover command), identify the donor DU 1280 connected to the determined new PCell, and, if it being different from the previously connected donor DU 1280, allocate a new IP address (step 1204). The address allocated in this way may be included in the handover command and delivered to IAB node 1 (1240) (step 1205). That is, here, an NR RRCreconfiguration message may be transmitted to IAB node 1 (1240). Upon receiving the above message, IAB node 1 (1240) may forward it to IAB node 3 (1220) (step 1206). The MT of IAB node 3 (1220) may apply the corresponding NR RRCreconfiguration message (step 1207), and may also set up the IP address included therein to the DU at this time. In this case, the IP address may be signaled by being included in the MCG part of the RRCreconfiguration message. Then, IAB node 3 (1220) may perform a random access process with IAB node 4 (1200) (step 1208). Thereafter, IAB node 3 (1120) may transmit an RRCconnectionReconfigurationComplete message to IAB node 4 (1200) (step 1209).

Figure 13:
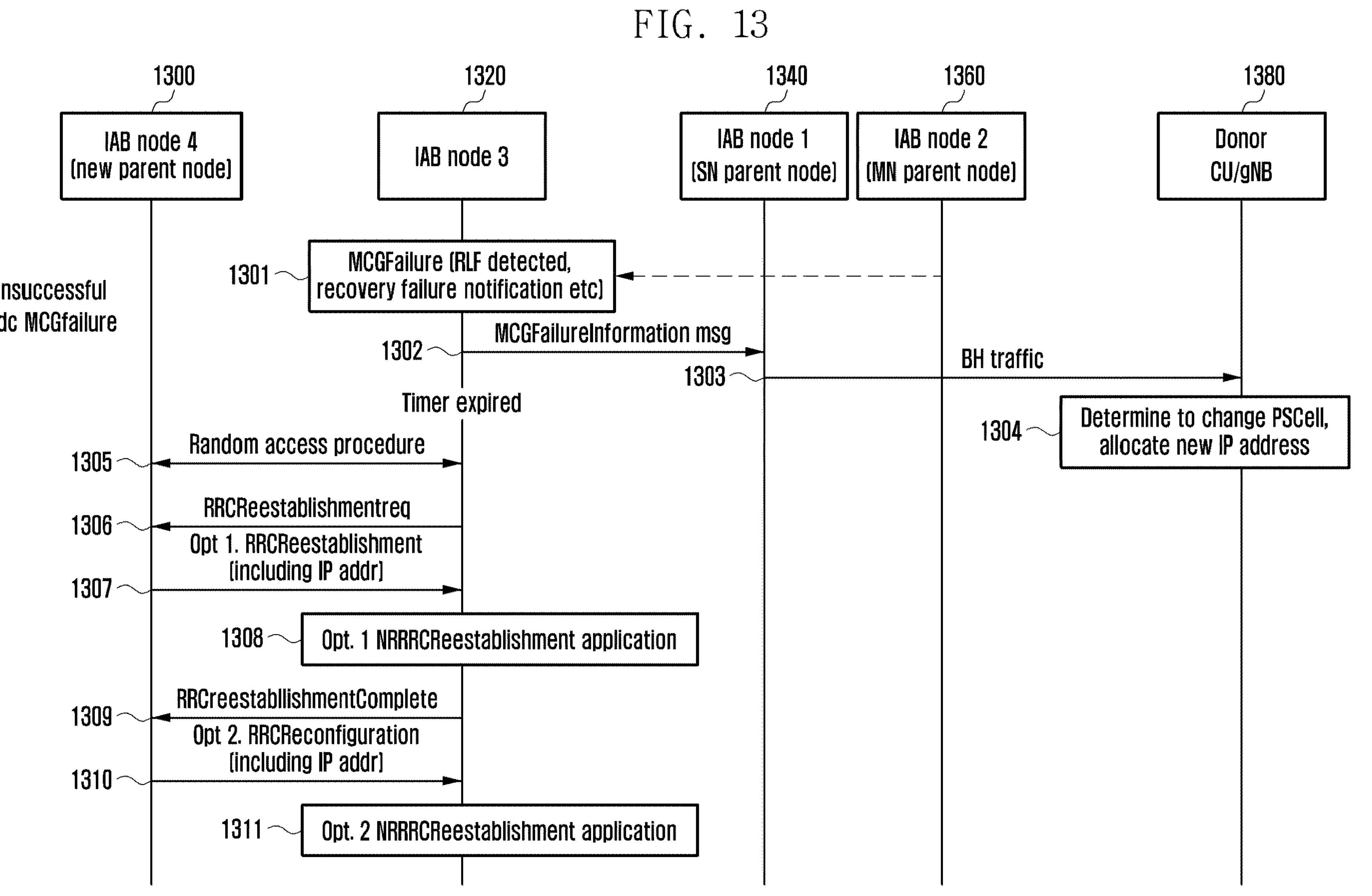
FIG. 13 is a diagram illustrating IP address allocation when the MCGfailure procedure fails in case of NR-DC.

FIG. 13 is a diagram illustrating IP address allocation when the MCGfailure procedure fails in case of NR-DC.

IAB node 3 (1320) is connected to IAB node 1 (1340) acting as an SN parent node and is connected to IAB node 2 (1360) acting as an MN parent node. When the MT of IAB node 3 (1320) detects an RLF in the link of IAB node 2 (1360) or receives an RLF notification from IAB node 2 (1360), or a PCell change failure occurs (step 1301), it may transmit a MCGFailureInformation message to IAB node 1 (1340) through the SN link (step 1302). IAB node 1 (1340) may transmit a MCGFailure-related report to the donor CU 1380 (step 1303). The donor CU 1380 may determine to change the PCell to another PCell (handover), compose a corresponding RRC message (handover command), identify the donor DU 1280 connected to the determined new PCell, and, if it being different from the previously connected donor DU 1280, allocate a new IP address (step 1304).

When transmitting the MCGFailureInformation message, the MT of IAB node 3 (1320) may start a timer. If a RRC release or RRCreconfiguration message is not received from the donor CU 1380 before this timer expires, the MT must select a new cell. After selecting a new cell, IAB node 3 (1320) may perform a random access procedure with IAB node 4 (1300) being the newly selected cell (step 1305), and perform an RRC re-establishment procedure (step 1306). When a RRC re-establishmentRequest is delivered to the newly selected cell (here, IAB node 4) through the procedure, IAB node 4 (1300) may transmit an RRC re-establishment message in association with the donor CU 1380 (step 1307), and may receive a RRC re-establishment message from the donor CU 1380 and forward it to IAB node 3 (1320). The above message may include an IP address newly allocated by the donor CU 1380. Upon receiving the RRC re-establishment message including an allocated IP address, IAB node 3 (1320) uses the received information as the IP address of the DU (step 1308).

In another embodiment, the MT of IAB node 3 (1320) having received RRCre-establishment may transmit RRCre-establishmentcomplete to IAB node 4 (1300) (step 1309). After receiving this message, IAB node 4 (1300) may transmit a RRCreconfiguration message back to IAB node 3 (1320) (step 1310). An IP address may be included in the transmitted message. Upon receiving the above message, IAB node 3 (1320) may allocate the corresponding received IP address to its DU (step 1311). When an IP address is allocated, both this RRC reconfiguration message and the RRCre-establishment message transmitted therebefore may include the allocated IP address in the MCG part for signaling.

The failure is recovered in all cases of FIGS. 10, 11, 12 and 13; in these cases, the RRC message transmitted from the donor CU may allocate an IP address without a process of requesting IP address allocation the from the MT or child IAB nodes connected thereto. This message may be a RRC re-establishment message, RRCreconfiguration message, DLInformationTransfer message, or new DL RRC message.

Figure 14:
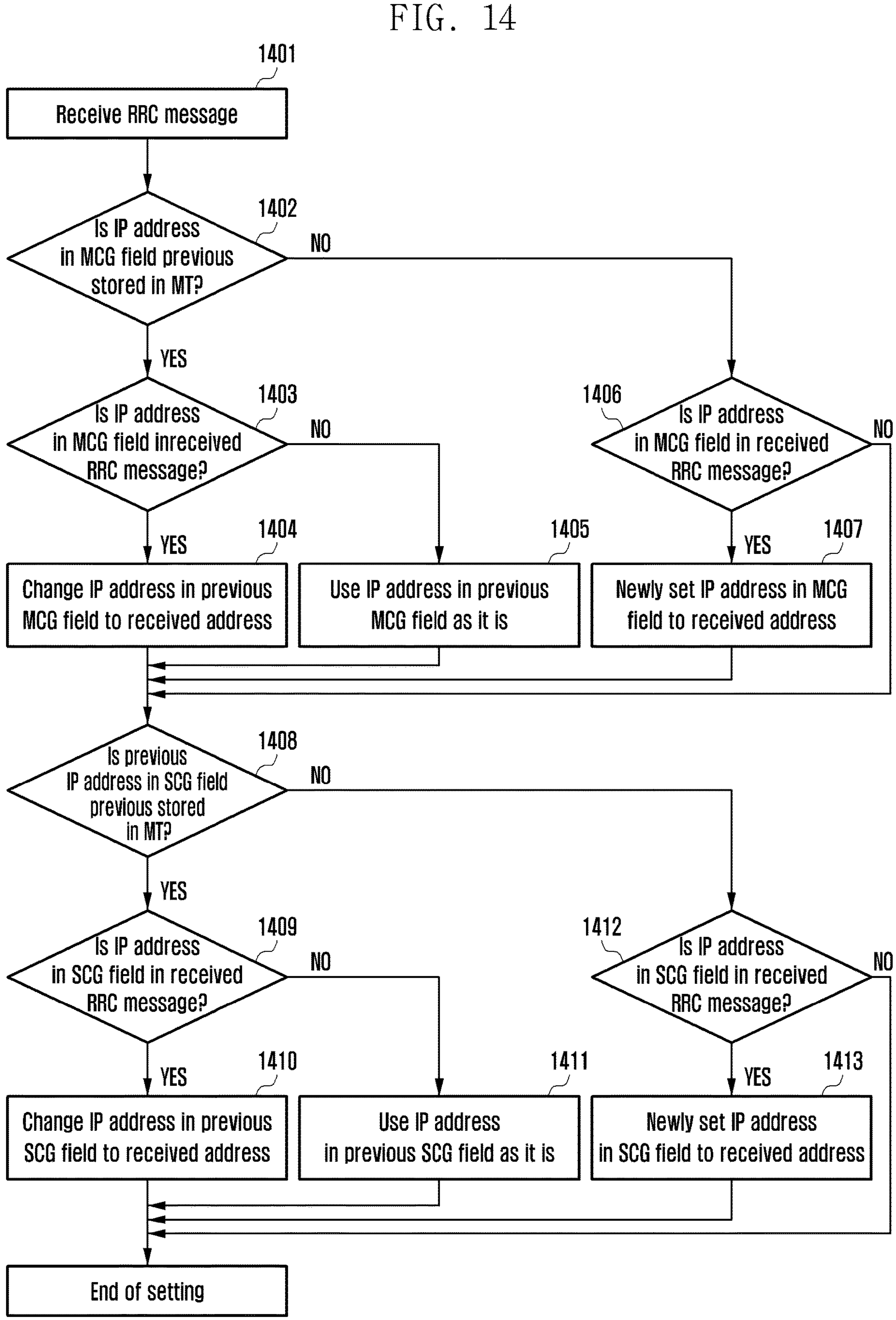
FIG. 14 is a diagram illustrating IP address allocation according to an embodiment of the disclosure.

FIG. 14 is a diagram illustrating IP address allocation according to an embodiment of the disclosure.

With reference to FIG. 14, the RRC message can use an MCG-SCG delimiter to distinguish whether the transmitted IP address is an IP address corresponding to the MCG or an IP address corresponding to the SCG (step 1401). The MT of the IAB node having received this message may deliver the IP address to the DU of the same IAB node with a distinction between the MCG and the SCG. The IP addresses thus received may be stored in a separate variable of the UE by use of the MCG-SCG delimiter.

An example of a delimiter can be one of the following.

The RRCReconfiguration message may have a master cell group (MCG) configuration IE and a secondary cell group (SCG) configuration IE as a sub-message, and may include an IP address value and version information under each of the MCG and SCG configurations. Alternatively, an IAB IP address IE may be present in the RRCreconfiguration message, and an IP address may be assigned under the corresponding IE along with a delimiter that distinguishes between the MCG and the SCG.

In addition, for mobility, that is, handover operation in connected mode other than failure recovery, an IP address may be assigned to the MCG part in the RRC message corresponding to the handover command in the case of MCG PCell handover; an IP address may be assigned to the SCG part in the RRC message corresponding to the PSCell handover command in the case of SCG PSCell change. Due to this, in the case of specific mobility, two IP addresses, an IP address in the IP address space by the donor DU connected to the MCG and an IP address in the IP address space by the donor DU connected to the SCG, can be signaled for the DU.

Depending on the type of RRC messages used for IP address allocation, there may be a case in which delta signaling can be applied and a case in which delta signaling cannot be applied. An IP address must always be set in an RRC re-establishment message. That is, delta signaling cannot be applied. An IAB node having received this message must always change its current IP address to the signaled IP address. An IP address may or may not be signaled with an RRCreconfiguration message or a new DL RRC message. Basically, if not signaled, the IAB node can keep the previously received address unchanged. If an IP address is signaled, it can change the previously received address.

Upon receiving the message, the MT may determine which of the MCG and SCG delimiters the IP address corresponds to. If there is a previously stored IP address corresponding to a delimiter, the previously stored IP address can be updated or changed to the received IP address corresponding to the delimiter. If there is a previously stored IP address for a delimiter, but there is no IP address corresponding to the delimiter in the received message, the MT can use the previously stored IP address corresponding to the delimiter as it is. Specifically, whether an IP address is previously stored in the MCG field in the MT may be determined (step 1402). If an IP address is previously stored in the MCG field in the MT, whether an IP address is present in the MCG field of the received RRC message may be determined (step 1403). If an IP address is present in the MCG field of the received RRC message, the IP address previously stored in the MCG field in the MT is changed to the received IP address (step 1404). However, if no IP address is present in the MCG field of the received RRC message, the IP address previously stored in the MCG field in the MT is used as it is (step 1405). Further, if no IP address is previously stored in the MCG field in the MT, whether an IP address is present in the MCG field of the received RRC message may be determined (step 1406). If an IP address is present in the MCG field of the received RRC message, the IP address in the MCG field of the received RRC message is newly set (step 1407). Thereafter, whether an IP address is previously stored in the SCG field in the MT may be determined (step 1408). If an IP address is previously stored in the SCG field in the MT, whether an IP address is present in the SCG field of the received RRC message may be determined (step 1409). If an IP address is present in the SCG field of the received RRC message, the IP address previously stored in the SCG field in the MT is changed to the received IP address (step 1410). However, if no IP address is present in the SCG field of the received RRC message, the IP address previously stored in the SCG field in the MT is used as it is (step 1411). Further, if no IP address is previously stored in the SCG field in the MT, whether an IP address is present in the SCG field of the received RRC message may be determined (step 1412). If an IP address is present in the SCG field of the received RRC message, the IP address in the SCG field of the received RRC message is newly set (step 1413).

As another embodiment, if IP address allocation through the OAM is not completed for a specific period of time after the IAB node has established an RRC connection, the connected IAB node may request an IP address. To this end, the IAB node may start a timer after establishing a DRB. As a more specific operation, after receiving a RRCreconfiguration message after transmission of connection setup complete, or as a response message to a received RRCreconfiguration, the UE may transmit a RRCreconfigurationComplete message and start a timer. This timer can be stopped when it is confirmed that the IP address has been received with OAM data through the DRB. If this timer expires, the IAB node may request IP address allocation by use of an RRC message.

All RRC messages requesting IP address allocation may include corresponding IAB node ID or DU ID information, and an indicator for which IP address system can be used, that is, information about IP version 4 or/and version 6.

As another embodiment, when the IAB node performs migration, the IAB donor CU delivers default UL backhaul information. Assuming a dual connectivity case, it may be a case in which one of the two links and the BH RLC channel are explicitly delivered. The IAB donor CU may instruct a specific IAB node to migrate or handover to another IAB parent node. If the specific IAB node (or IAB MT) is configured with dual connectivity, a message provided by the IAB donor CU in a RRCreconfiguration message may be delivered as a handover command, which includes physical cell identity of the IAB node serving as the target cell, target DL frequency, and configuration information to be used in the corresponding cell. Default UL BH information may be delivered therealong. The default UL BH information may include a routing ID used for routing in the backhaul adaptation protocol (BAP), and may include egress BH RLC channel information. The egress BH RLC channel information may mean specific egress link information and specific BH RLC channel IDs defined on the corresponding link. The egress link information may indicate, from the viewpoint of the IAB MT, an indicator to the MCG or SCG after performing handover or a BAP address of the next hop node at the BAP layer. Further, via the RRC message, the IP address allocated by the IAB donor DU connected to the IAB parent node corresponding to the SCG or MCG may be configured separately for the MCG or SCG.

The IAB MT having received corresponding information may apply the received RRC configuration information by performing handover to the target cell, that is, the cell of the target parent IAB node. From the time point of applying the handover message, for UL traffic generated in the upper layer, the BAP layer may discard routing ID selection configuration information and BH RLC channel mapping configuration information, assume that there is no such information, or change them to given default BH UL information. After the application, for the generated F1-C/F1-AP traffic or the BAP SDU that is received from the child IAB node and is to be transmitted in the UL direction through the BH, the IAB MT may add the received routing ID information to the BAP header to create a BAP PDU and transmit the corresponding BAP PDU (UL BAP PDU) via the egress link and egress BH RLC channel indicated by the default UL BH information. After handover, when the IAB MT receives a new update of the routing information of the BAP layer from the IAB donor CU through F1-AP, it may initiate routing for the BAP PDU by using the updated routing configuration information thereafter. From now on, according to the IP address received for the MCG or SCG, it is possible to select an entry indicated by the corresponding IP address from among entries in the routing table and perform routing.

As another embodiment, only information about one BH RLC channel of one egress link has been added to the default UL BH information, but in a specific case, for example, when migration is performed in a dual connectivity situation, two pieces of default UL backhaul information may be transmitted via a RRC reconfiguration message. In this case, the IAB donor CU may transmit, at a specific time, an RRC reconfiguration message (or, another DL RRC message), which includes one RRC message carrying the whole default UL backhaul information or separate RRC messages carrying their respective default UL backhaul information. Each default UL backhaul information may be set based on which cell group link is migrated at the time when the RRC message is received (i.e., at the time when configuration information of migration or handover command is applied). That is, each default UL backhaul information may be set by being associated with the MCG or SCG indicator or by being included in the MCG/SCG configuration information, and the UE may perform UL transmission through the backhaul by applying the default UL backhaul information set as an MCG parameter when performing PCell handover (or during migration of the MCG link). Similarly, when performing SPCell handover (during migration of the SCG link), the default UL backhaul information set as an SCG parameter may be followed.

As another embodiment, in a situation where dual connectivity is established, the default UL BH information in the RRC reconfiguration message may be determined by not including a separate egress link without network configuration. Here, a possible egress link may be a link with the target cell to which HO has performed, or may mean a link with a cell to which HO has not performed.

The default UL BH information may be delivered not only in case of receiving a HO command but also in case of receiving an RRC connection setup message (for transitioning from idle to connected mode) or RRC resume message (for transitioning from inactive to connected mode) from the base station when the IAB MT is transitioned from idle mode or inactive mode to connected mode, where the above information may be included in the received message. Also in this case, the IAB node or IAB MT having received the message may apply the configuration information included in the corresponding RRC message. As in the case of handover, the received default UL BH information may be applied. After the above application, for generated F1-C/F1-AP traffic, traffic generated in the upper layer of the BAP of the receiving node, or a BAP SDU that is received from the child IAB node and is to be transmitted in the UL direction via the BH, the IAB MT may add the received routing ID information to the BAP header to create a BAP PDU and transmit the corresponding BAP PDU (UL BAP PDU) through the egress link and egress BH RLC channel indicated by the default UL BH information. In case of handover or transitioning from inactive or idle mode to connected mode, when the IAB MT receives a new update of the routing information of the BAP layer from the IAB donor CU through F1-AP, it may initiate routing for the BAP PDU by using the updated routing configuration information thereafter. From now on, according to the IP address received for the MCG or SCG, it is possible to select an entry indicated by the corresponding IP address from among entries in the routing table and perform routing.

FIG. 15 is a diagram illustrating a process of performing conditional handover when an IAB node receives an RLF recovery failure notification from the parent node according to an embodiment.

IAB node 2 (1520) may be connected to IAB node 1 (1540) acting as a parent node, and IAB node 1 (1540) may be connected to the donor DU and donor CU of the donor gNB 1560 acting as a parent node.

IAB node 2 (1520) in connected state may receive an indication to perform conditional handover when receiving an RLF recovery failure notification from the parent node through an RRC message from its donor gNB 1560 or donor eNB (step 1501).

Thereafter, the donor gNB 1560 may assign candidate cell IDs or conditional reconfiguration IDs as configuration information of target candidate cells to which conditional handover is to be performed and information about conditions for performing conditional handover to these cells, and configure them to the MT of IAB node 2 (1520) (step 1502).

This target candidate cell information may include information about a cell selected by the CU as having good channel quality based on a previous measurement report. The configuration information received by the MT of the IAB node from the CU may include information necessary for a corresponding UE to access the cell for transmission/reception, and may include information included in the handover command for a regular UE. The above information may include access information, bearer configuration information, radio resource configuration information, measurement configuration information, configuration information of each layer 1/2 protocol entity, or the like for the target cell. As information for identifying the target cell, information about a DL frequency in which the cell is located, physical cell ID information, and the like may be included.

Upon receiving this information, the MT of IAB node 2 (1520) may store the conditional handover execution condition and target cell configuration information along with this conditional reconfiguration ID (step 1503).

At a specific time point, the parent node of IAB node 2 (1520) may attempt RLF recovery, where RLF recovery may be an RRC reestablishment procedure from the viewpoint of IAB node 1 (1540). Alternatively, RLF recovery may be a SCGFailureInformation procedure or a MCGFailureInformation procedure from the viewpoint of IAB node 1 (1540). If the recovery fails (step 1504), a corresponding RLF recovery failure indication may be transmitted to the child node through BAP control signaling (step 1505).

When the MT of IAB node 2 (1520) receives this indication, it may perform cell selection. If the cell selected as a result of cell selection is one of the candidate target cells previously received and stored, handover may be performed to the selected cell. Here, among the previously received and stored configuration information of the candidate target cells, the configuration information of the selected cell may be applied and HO may be performed (step 1506).

In another embodiment, the MT of IAB node 2 (1520) may select one of the currently stored candidate target cells without regular cell selection, and perform handover by applying the stored configuration information of the selected candidate target cell. In this case, the cell selection criterion may be channel quality, and a cell having the best channel quality may be selected for example, (step 1506). In addition, assuming that the selected candidate target cell is IAB node 3 (1500), the MT of IAB node 2 (1520) may transmit a random access preamble to IAB node 3 (1500) being a candidate target cell (step 1507), and receive a random access response (step 1508). Upon receiving the random access response, the MT of IAB node 2 (1520) may transmit an RRCreconfigurationComplete message (step 1509).

Figure 16:
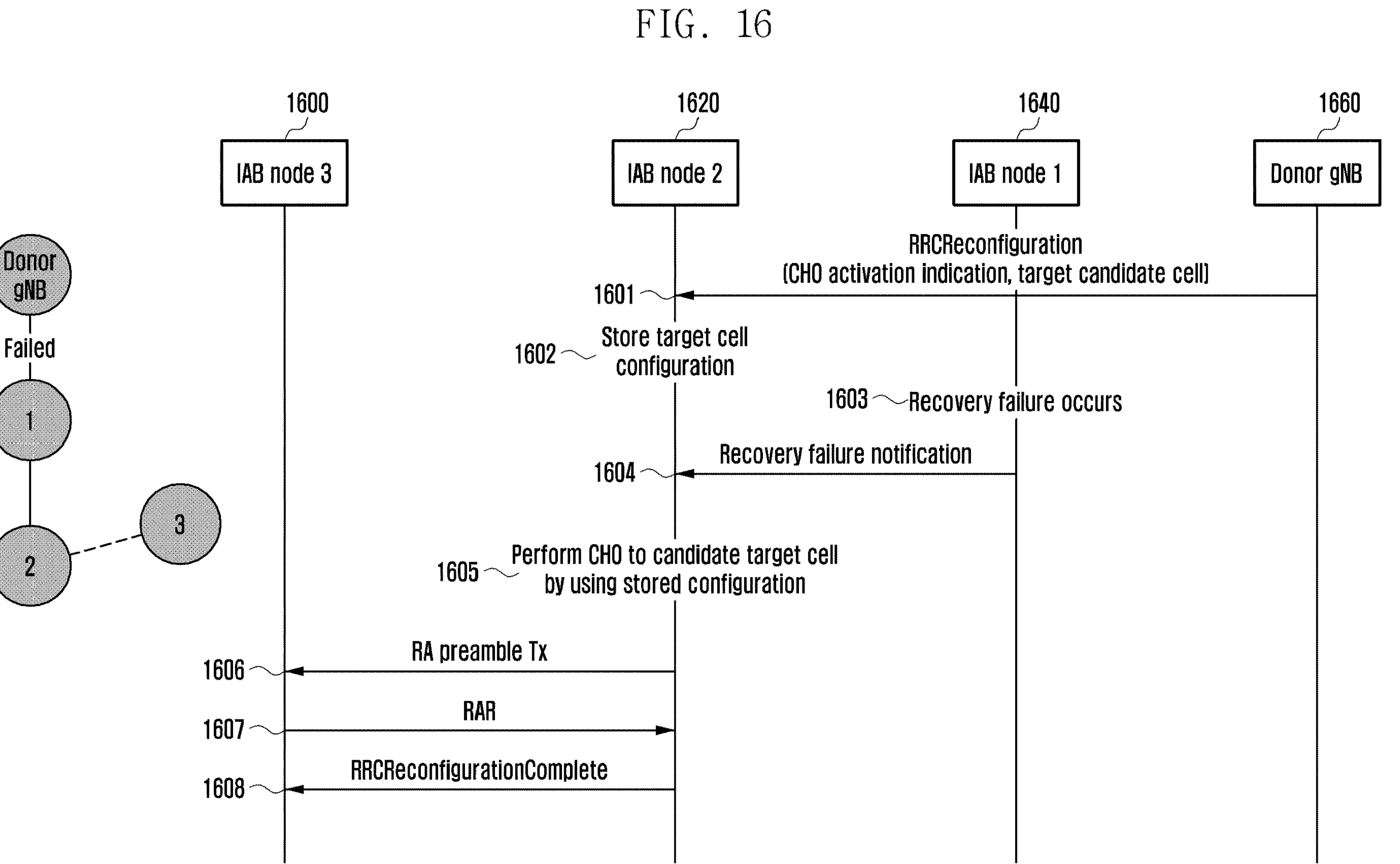
FIG. 16 is a diagram illustrating a method of configuring a separate cell to which handover is to be performed when an IAB node receives a recovery failure notification according to an embodiment.

FIG. 16 is a diagram illustrating a method of configuring a separate cell to which handover is to be performed when an IAB node receives a recovery failure notification according to an embodiment.

IAB node 2 (1620) may be connected to IAB node 1 (1640) acting as a parent node, and IAB node 1 may be connected to the donor DU and donor CU of the donor gNB 1660 acting as a parent node.

IAB node 2 (1620) in connected state may receive an indication to perform conditional handover when receiving an RLF recovery failure notification from the parent node through an RRC message from its donor gNB 1660 or donor eNB (step 1601). Together with or separately from the indication to perform conditional handover, configuration information of a target cell to move when corresponding conditional handover is performed may be transmitted. Here, a conditional reconfiguration ID or candidate target cell ID may be transmitted together (step 1601).

This target candidate cell information may include information about a cell selected by the CU as having good channel quality based on a previous measurement report. The configuration information received by the MT of the IAB node from the CU may include information necessary for a corresponding UE to access the cell for transmission/reception, and may include information included in the handover command for a regular UE. The above information may include access information, bearer configuration information, radio resource configuration information, measurement configuration information, configuration information of each layer 1/2 protocol entity, or the like for the target cell. As information for identifying the target cell, information about a DL frequency in which the cell is located, physical cell ID information, and the like may be included.

Upon receiving this information, the MT of IAB node 2 (1620) may store the target cell configuration information along with the conditional reconfiguration ID (step 1602).

At a specific time point, the parent node of IAB node 2 (1620) may attempt RLF recovery, and if the recovery fails (step 1603), a corresponding RLF recovery failure indication may be transmitted to the child node through BAP control signaling (step 1604).

When the MT of IAB node 2 (1620) receives this indication, it may perform handover to the candidate target cell indicated by the information received at step 1601. In this case, the target cell configuration information stored at step 1601 may be applied. If a plurality of cells and their configuration information are received (at step 1601), the MT of IAB node 2 (1620) may select a cell having the best channel state among the plural cells to perform handover (step 1605).

Here, assuming that the selected candidate target cell is IAB node 3 (1600), the MT of IAB node 2 (1620) may transmit a random access preamble to the candidate target cell (step 1606), and receive a random access response (step 1607). Upon receiving the random access response, the MT of IAB node 2 (1620) may transmit an RRCreconfigurationComplete message (step 1608).

Figure 17:
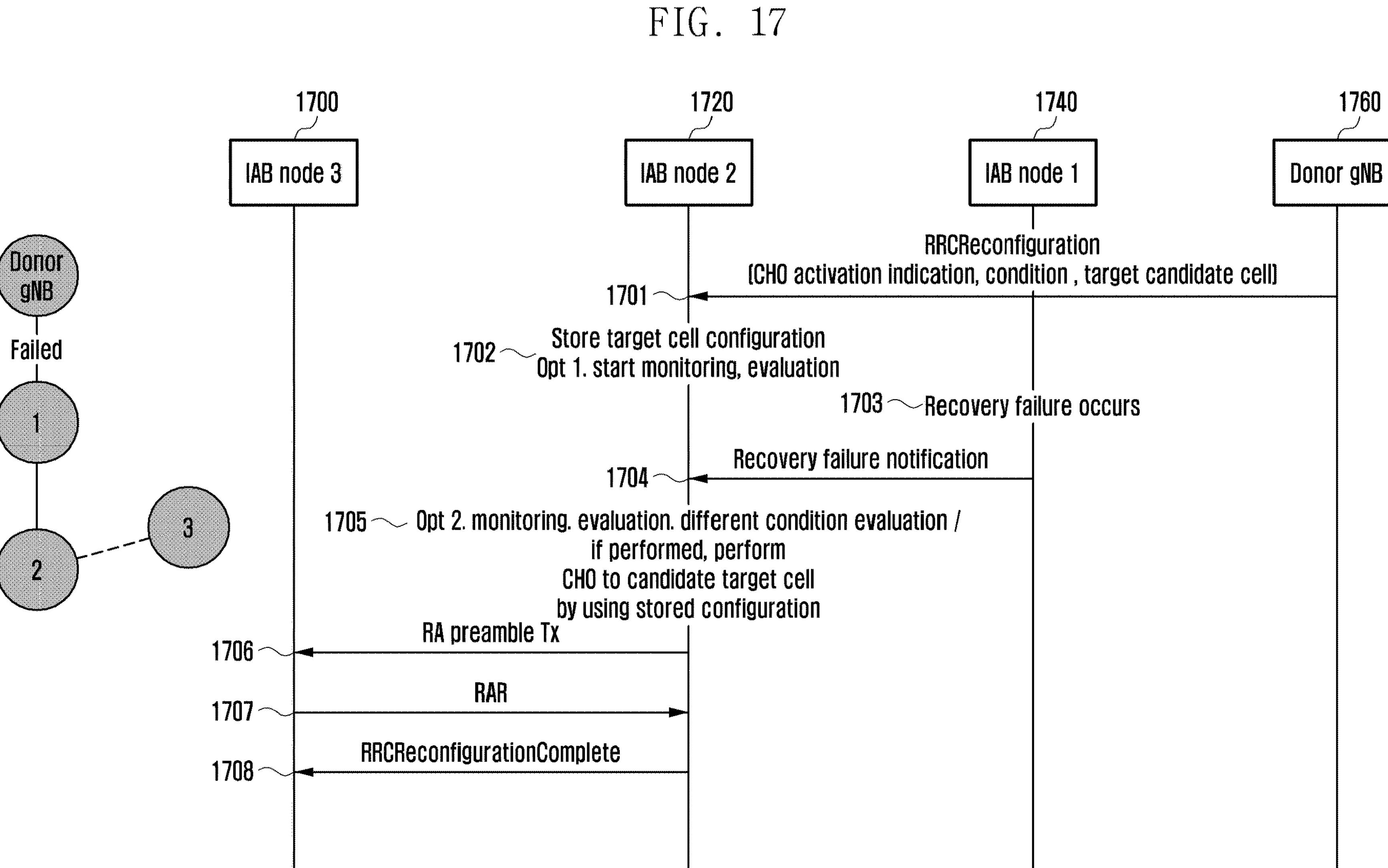
FIG. 17 is a diagram illustrating a process of performing conditional handover in case that a separate cell to which handover is to be performed and an additional determination criterion are given when an IAB node receives an RLF recovery failure notification according to an embodiment.

FIG. 17 is a diagram illustrating a process of performing conditional handover in case that a separate cell to which handover is to be performed and an additional determination criterion are given when an IAB node receives an RLF recovery failure notification according to an embodiment.

IAB node 2 (1720) may be connected to IAB node 1 (1740) acting as a parent node, and IAB node 1 (1740) may be connected to the donor DU and donor CU of the donor gNB 1760 acting as a parent node.

IAB node 2 (1720) in connected state may receive an indication to perform conditional handover when receiving an RLF recovery failure notification from the parent node through an RRC message from its donor gNB 1760 or donor eNB (step 1701). Together with or separately from the indication to perform conditional handover, configuration information of a target cell to move when corresponding conditional handover is performed may be transmitted. Here, a conditional reconfiguration ID or candidate target cell ID may be transmitted together (step 1701). In addition, information about a condition for performing handover to the corresponding target cell may be transmitted (step 1701).

This target candidate cell information may include information about a cell selected by the CU as having good channel quality based on a previous measurement report. The configuration information received by the MT of the IAB node from the CU may include information necessary for a corresponding UE to access the cell for transmission/reception, and may include information included in the handover command for a regular UE. The above information may include access information, bearer configuration information, radio resource configuration information, measurement configuration information, configuration information of each layer 1/2 protocol entity, or the like for the target cell. As information for identifying the target cell, information about a DL frequency in which the cell is located, physical cell ID information, and the like may be included.

The condition information may include a measurement being a pair of measurement object and report configuration. In particular, the report configuration may indicate a corresponding event A3, A4, or A5, and may correspond to a plurality of {report configuration, measurement object} pairs, that is, a group of measurement IDs combined by AND or OR connectives. Conditional handover can be performed only when this composite condition is satisfied. Also, the measurement object must have smtc3. Here, smtc3 is a configuration value for the measurement time of the SSB transmitted by the DU of a neighbor IAB node, and, unlike existing smtc1 and smtc2, is a value considering only SSBs transmitted by the IAB node.

Upon receiving this information, the MT of IAB node 2 (1720) may store the target cell configuration information along with the conditional reconfiguration ID (step 1702). Also, the MT of IAB node 2 (1720) may start a measurement operation and a condition determination operation for each execution condition. In another embodiment, the MT of IAB node 2 (1720) may perform the measurement operation and the condition determination operation after receiving an RLF recovery failure notification from the parent node (step 1705).

At a specific time point, the parent node of IAB node 2 (1720) may attempt RLF recovery, and if the recovery fails (step 1703), the parent node may transmit a corresponding RLF recovery failure indication to the child node through BAP control signaling (step 1704).

When the MT of IAB node 2 (1720) receives this indication, it may additionally evaluate the execution condition associated with the candidate target cells received at step 1701. The MT of IAB node 2 (1720) may select a candidate target cell satisfying this execution condition and perform handover to the selected cell. In this case, the MT of IAB node 2 (1720) may apply the target cell configuration information stored at step 1701. If configuration information of plural cells and their execution conditions are received at step 1701, and there are multiple cells satisfying their respective execution conditions among the plural cells, the MT of IAB node 2 (1720) may perform handover by selecting the best cell from among the plural cells based on the result of combining one or multiple of the following criteria (step 1705). The criteria may be as follows.

- The cell with the best channel condition, where a cell with the largest RSRP, RSRQ or RSSI value is selected
- The cell with the largest number of good beams, where the MT can receive the threshold value of the channel state for determining the good beam from the network. A beam exceeding this threshold value may be defined as a good beam.
- The intensity of the load applied to the backhaul traffic. Select a cell with the smallest strength
- Select a cell with the highest PHY radio resource availability Here, assuming that the selected candidate target cell is IAB node 3 (1700), the MT of IAB node 2 (1720) may transmit a random access preamble to the candidate target cell (step 1706), and receive a random access response from IAB node 3 (1700) (step 1707). Upon receiving the random access response, the MT of IAB node 2 (1720) may transmit an RRCreconfigurationComplete message (step 1708).

In an additional embodiment, if an IAB node receives an RLF recovery failure notification from an SCG parent node thereof, it may ignore the conditional handover operation configured in advance and perform a SCGFailureInformation procedure. In this case, conditional handover operation means performing handover to a given candidate target cell when receiving an RLF recovery failure notification from the parent node. Instead, handover may still be performed by evaluating channel conditions regardless of an RLF recovery failure notification. The donor CU of the donor gNB may transmit the IAB node an indicator of whether to perform a SCGFailureInformation operation or to perform conditional handover in response to receiving an RLF recovery failure notification from the SCG parent.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium are configured to be executable by one or more processors of an electronic device. The one or more programs include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EEPROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide LAN (WLAN), or a storage area network (SAN), or through a communication network composed of a combination thereof. Such a storage device may access the device that carries out an embodiment of the disclosure through an external port. In addition, a separate storage device on a communication network may access the device that carries out an embodiment of the disclosure.

In the specific embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, the embodiments of the disclosure disclosed in the present specification and drawings are provided as specific examples to easily explain the technical contents of the disclosure and help understanding of the disclosure, and are not intended to limit the scope of the disclosure. That is, it is apparent to those of ordinary skill in the art to which the disclosure pertains that other modifications can be carried out based on the technical spirit of the disclosure. In addition, the above embodiments may be operated in combination with each other as needed. For example, the base station and the terminal may be operated by combining parts of one embodiment and another embodiment of the disclosure with each other. Further, other modifications based on the technical idea of the above embodiments may be carried out in various systems such as FDD LTE system, TDD LTE system, 5G or NR system.

What is claimed is:

1. A method performed by a mobile-termination (MT), the method comprising:

transmitting, to a donor central unit (CU), a Radio Resource Control (RRC) message to request an allocation of an Internet Protocol (IP) address, the RRC message including information associated with IP version 4 or IP version 6;

in response to the transmitting the RRC message, receiving, from the donor CU, an RRC reconfiguration message including first configuration information for a Master cell group (MCG), an IP address for the MCG, and second configuration information for a secondary cell group (SCG) in a multi-radio dual connectivity (MR-DC);

identifying whether the second configuration information includes an IP address for the SCG in the MR-DC; and in case that the second configuration information includes the IP address for the SCG in the MR-DC, adding the IP address for the SCG in the MR-DC.

2. The method of claim 1, further comprising:

changing an IAB-MT configuration associated with the IP address for the SCG in case that the IP address for the SCG is part of the IAB-MT configuration.

3. The method of claim 1, wherein the RRC message is a ULInformationTransferMRDC message in case that the RRC message is transmitted via a node associated with an E-UTRAN (Evolved UMTS Terrestrial Radio Access Network).

4. A method performed by a donor central unit (CU), the method comprising:

receiving, from a mobile-termination (MT), a Radio Resource Control (RRC) message to request an allocation of an Internet Protocol (IP) address, the RRC message including information associated with IP version 4 or IP version 6; and in response to the receiving the RRC message, transmitting, to the MT, an RRC reconfiguration message including first configuration information for a Master cell group (MCG), an IP address for the MCG and second configuration information for a secondary cell group (SCG) in a multi-radio dual connectivity (MR-DC), wherein an IP address for the SCG in the MR-DC is added in case that the second configuration information includes the IP address for the SCG in the MR-DC.

5. The method of claim 4, wherein an IAB-MT configuration associated with the IP address for the SCG is changed in case that the IP address for the SCG is part of the IAB-MT configuration.

6. The method of claim 4, wherein the RRC message is a ULInformationTransferMRDC message in case that the RRC message is received via a node associated with an E-UTRAN (Evolved UMTS Terrestrial Radio Access Network).

7. A mobile-termination (MT), the MT comprising:

a transceiver capable of transmitting and receiving at least one signal; and a controller coupled to the transceiver, wherein the controller is configured to: transmit, to a donor central unit (CU), a Radio Resource Control (RRC) message to request an allocation of an Internet Protocol (IP) address, the RRC message including information associated with IP version 4 or IP version 6, in response to the transmitting the RRC message, receive, from the donor CU, an RRC reconfiguration message including first configuration information for a Master cell group (MCG), an IP address for the MCG and second configuration information for a secondary cell group (SCG) in a multi-radio dual connectivity (MR-DC), identify whether the second configuration information includes an IP address for the SCG in the MR-DC, and in case that the second configuration information includes the IP address for the SCG in the MR-DC, add the IP address for the SCG in the MR-DC.

8. The MT of claim 7, wherein the controller is further configured to:

change an IAB-MT configuration associated with the IP address for the SCG in case that the IP address for the SCG is part of the IAB-MT configuration.

9. The MT of claim 7, wherein the RRC message is a ULInformationTransferMRDC message in case that the RRC message is transmitted via a node associated with an E-UTRAN (Evolved UMTS Terrestrial Radio Access Network).

10. A donor central unit (CU), the donor CU comprising:

a transceiver capable of transmitting and receiving at least one signal; and a controller coupled to the transceiver, wherein the controller is configured to:

receive, from a mobile-termination (MT), a Radio Resource Control (RRC) message to request an allocation of an Internet Protocol (IP) address, the RRC message including information associated with IP version 4 or IP version 6, in response to the receiving the RRC message, transmit, to the MT, an RRC reconfiguration message including first configuration information for a Master cell group (MCG), an IP address for the MCG and second configuration information for a secondary cell group (SCG) in a multi-radio dual connectivity (MR-DC), wherein an IP address for the SCG in the MR-DC is added in case that the second configuration information includes the IP address for the SCG in the MR-DC.

11. The donor CU of claim 10, wherein an IAB-MT configuration associated with the IP address for the SCG is changed in case that the IP address for the SCG is part of the IAB-MT configuration, and wherein the RRC message is a ULInformationTransfer-MRDC message in case that the RRC message is received via a node associated with an E-UTRAN (Evolved UMTS Terrestrial Radio Access Network).

* * * * *